US010390209B2

(12) United States Patent
Chong et al.

(10) Patent No.: US 10,390,209 B2
(45) Date of Patent: Aug. 20, 2019

(54) VOICE ROAMING METHOD, MOBILITY MANAGEMENT NETWORK ELEMENT, AND ACCESS NETWORK ELEMENT

(71) Applicant: HUAWEI TECHNOLOGIES CO., LTD., Shenzhen, Guangdong (CN)

(72) Inventors: Weiwei Chong, Shanghai (CN); Xiaobo Wu, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/971,865

(22) Filed: May 4, 2018

(65) Prior Publication Data
US 2018/0255447 A1 Sep. 6, 2018

Related U.S. Application Data

(63) Continuation of application No. PCT/CN2015/094016, filed on Nov. 6, 2015.

(51) Int. Cl.
*H04W 4/00* (2018.01)
*H04W 8/02* (2009.01)
(Continued)

(52) U.S. Cl.
CPC ............ *H04W 8/02* (2013.01); *H04W 48/02* (2013.01); *H04W 36/0022* (2013.01); *H04W 76/18* (2018.02)

(58) Field of Classification Search
CPC ......... H04W 8/183; H04W 8/12; H04W 8/06; H04W 8/26; H04W 8/18; H04W 8/04;
(Continued)

(56) References Cited

U.S. PATENT DOCUMENTS 9,344,933 B1* 5/2016 Velusamy ............. H04W 24/04
9,794,769 B2* 10/2017 Dubesset ................ H04W 8/12
(Continued)

FOREIGN PATENT DOCUMENTS

CN 101909343 A 12/2010
CN 103731814 A 4/2014
(Continued)

OTHER PUBLICATIONS

S2-150985 NTT DOCOMO,"Discussion on S8HR VoLTE Roaming",TSG SA WG2 #108,San Jose Del Cabo, Mexico,Apr. 13-17, 2015,total 14 pages.
(Continued)

*Primary Examiner* — Temica M Beamer
(74) *Attorney, Agent, or Firm* — Womble Bond Dickinson (US) LLP

(57) ABSTRACT

A voice roaming method, a mobility management network element, and an access network element are provided. When determining that a terminal is a roaming terminal and supports a voice over Long Term Evolution (VoLTE) service in a roaming network, the mobility management network element prohibits a single radio voice call continuity (SRVCC) function of the terminal, and notifies the access network element, so that the access network element prohibits triggering an SRVCC procedure for the terminal.

18 Claims, 12 Drawing Sheets

(51) Int. Cl.
*H04W 48/02* (2009.01)
*H04W 36/00* (2009.01)
*H04W 76/18* (2018.01)

(58) Field of Classification Search
CPC ..... H04W 48/16; H04W 48/18; H04W 60/00; H04W 60/04; H04W 12/06; H04W 88/06; H04W 36/14; H04W 36/08; H04W 36/18; H04W 36/30; H04W 36/12; H04W 36/32; H04W 36/0055; H04W 92/24
USPC ... 455/432.1, 432.3, 433, 435.1, 435.2, 436, 455/439, 440
See application file for complete search history.

(56) References Cited

U.S. PATENT DOCUMENTS

2016/0135093 A1* 5/2016 Wong ................ H04W 36/0022 370/331
2016/0262006 A1* 9/2016 Keller .................... H04W 8/10
2016/0330655 A1* 11/2016 Vashi ................ H04W 36/0022
2018/0227419 A1* 8/2018 Stojanovski ........ H04L 65/1016

FOREIGN PATENT DOCUMENTS

| | | |
|---|---|---|
| EP | 2288205 A1 | 2/2011 |
| EP | 3089489 A | 11/2016 |
| WO | 2013050061 A1 | 4/2013 |

OTHER PUBLICATIONS

S2-115180 R2-115941 Nokia Siemens Networks,"SRVCC Capability and FGI setting in NAS and AS", SA WG2 Meeting #88 S2-115180,3GPP TSG-RAN WG2 Meeting #76,San Francisco, USA, Nov. 14-18, 2011,total 4 pages.

S2-120547 Alcatel-Lucent,"ASINAS SRVCC capability bits and voice domain selection",SA WG2 Meeting #89,Feb. 6-10, 2012, Vancouver, Canada,total 4 pages.

* cited by examiner

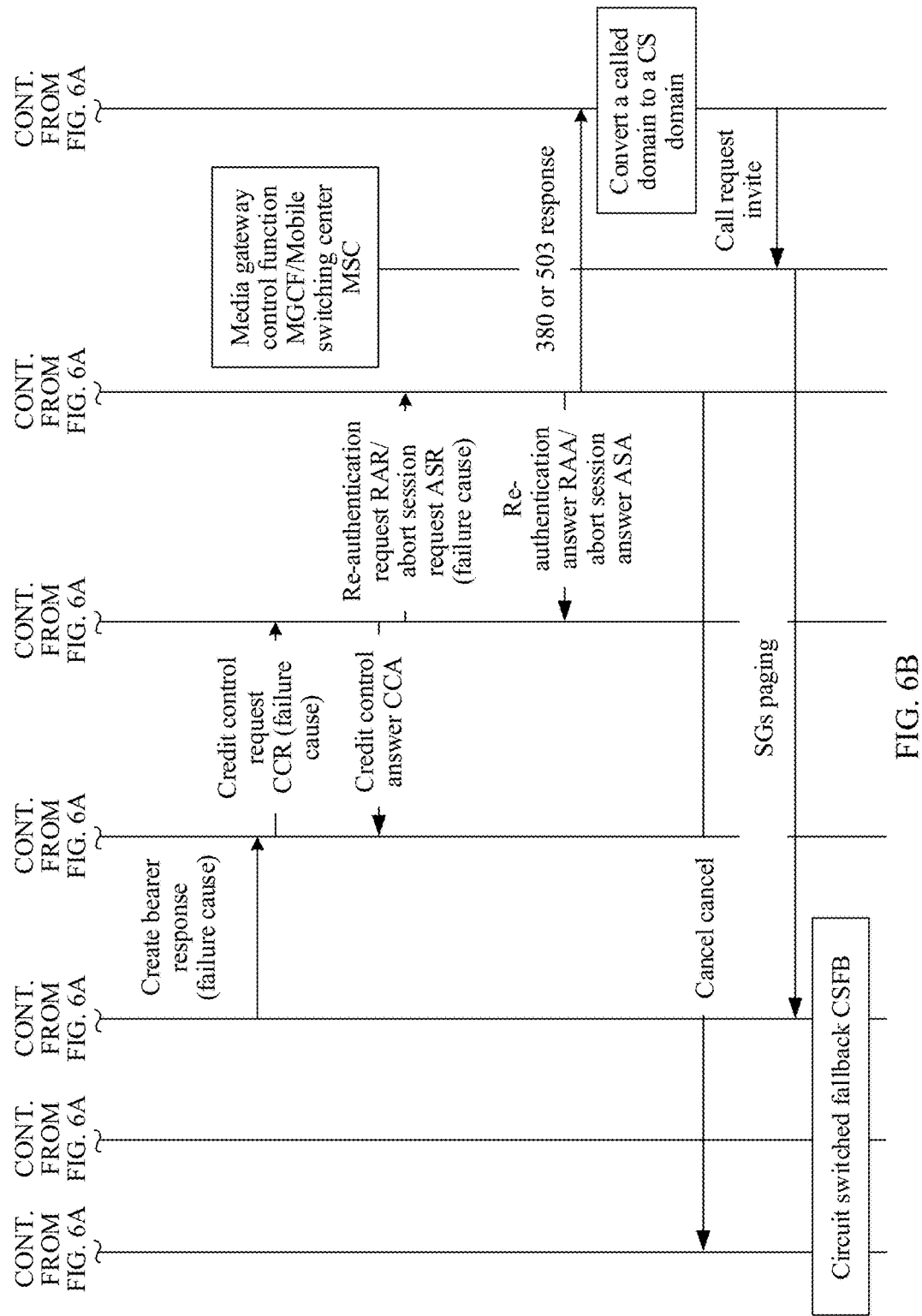

VOICE ROAMING METHOD, MOBILITY MANAGEMENT NETWORK ELEMENT, AND ACCESS NETWORK ELEMENT

CROSS-REFERENCE TO RELATED APPLICATIONS

This application is a continuation of International Patent Application No. PCT/CN2015/094016 filed on Nov. 6, 2015. The disclosure of the aforementioned application is hereby incorporated by reference in the entity.

TECHNICAL FIELD

The present disclosure relates to the field of communications technologies, and in particular, to a voice roaming method, a mobility management network element, and an access network element.

BACKGROUND

Voice over Long Term Evolution (VoLTE) is a voice service based on an Internet Protocol multimedia subsystem (IMS). Because the IMS supports a plurality of accesses and abundant multimedia services, the IMS becomes a standard core network architecture in an all-IP era. The VoLTE is an IP data transmission technology. Instead of a $2^{nd}$ generation mobile communications technology/$3^{rd}$ generation mobile communications technology (2G/3G) network, all services are carried on a $4^{th}$ generation mobile communications technology (4G) network, so as to implement unification of data and voice services in one network. S8 interface home routing (S8HR) is a VoLTE roaming solution. FIG. 1 is a schematic diagram of a VoLTE S8HR architecture. When an S8HR terminal initiates IMS registration, a visited public land mobile network (VPLMN) selects a public data network gateway (PGW) in a home public land mobile network (HPLMN) for the terminal to establish a connection, and sends registration information to an IMS device in the HPLMN for registration.

However, single radio voice call continuity (SRVCC) in the S8HR roaming architecture is a technical problem difficult to resolve. The SRVCC means: If a terminal when performing a VoLTE service enters an area with poor Long Term Evolution (LTE) network coverage, and LTE signal quality in the area is not high enough to continuously support a VoLTE session requirement of a user, a network side triggers an SRVCC handover procedure to hand over the VoLTE session to a conventional 2G/3G circuit switched (CS) session to continue the conventional 2G/3G circuit switched session, ensuring that a voice conversation of the user is not interrupted. It is required that voice interrupt latency caused in an entire handover process cannot exceed 300 ms. However, in an S8HR roaming architecture, SRVCC handover cannot meet the requirement.

SUMMARY

Embodiments of the present invention provide a voice roaming method, a mobility management network element, and an access network element, to resolve a problem that an interrupt latency requirement of SRVCC cannot be met in an S8HR roaming architecture currently.

According to a first aspect, a voice roaming method is provided, including:

determining, by a mobility management network element, that a terminal is a terminal roaming in a visited public land mobile network VPLMN and the terminal can use a voice over Long Term Evolution VoLTE service in the VPLMN; and prohibiting, by the mobility management network element, a single radio voice call continuity SRVCC function of the terminal.

When determining that the terminal is a roaming terminal and supports the VoLTE service in a roaming network, the mobility management network element prohibits the SRVCC function of the terminal, and notifies an access network element, so that the access network element prohibits triggering an SRVCC procedure for the terminal.

With reference to the first aspect, in a first possible embodiment, the method further includes:

determining, by the mobility management network element, that the VoLTE service of the terminal is to be based on an S8 interface home routing S8HR communication architecture.

With reference to the first possible embodiment of the first aspect, in a second possible embodiment, the determining, by the mobility management network element, that the VoLTE service of the terminal is to be based on an S8HR communication architecture includes:

obtaining, by the mobility management network element, home public land mobile network HPLMN identifier information of the terminal;

searching, by the mobility management network element, for preset configuration information corresponding to the HPLMN identifier information, where the configuration information includes information about a roaming agreement between the visited public land mobile network VPLMN and an HPLMN corresponding to an HPLMN identifier; and if the information about the S8HR roaming agreement between the HPLMN and the VPLMN is found, determining, by the mobility management network element, that the VoLTE service of the terminal is to be based on the S8HR communication architecture.

With reference to the first possible embodiment of the first aspect, in a third possible embodiment, the determining, by the mobility management network element, that the VoLTE service of the terminal is to be based on an S8HR communication architecture includes:

obtaining, by the mobility management network element, subscription data of the terminal; and determining, by the mobility management network element according to the subscription data, that the VoLTE service of the terminal is to be based on the S8HR communication architecture.

With reference to the first aspect, the first possible embodiment of the first aspect, the second possible embodiment of the first aspect, or the third possible embodiment of the first aspect, in a fourth possible embodiment, the prohibiting, by the mobility management network element, an SRVCC function of the terminal includes:

sending, by the mobility management network element, first indication information to an access network element, where the first indication information is used to indicate that the mobility management network element does not support the SRVCC function of the terminal.

With reference to the fourth possible embodiment of the first aspect, in a fifth possible embodiment, the sending, by the mobility management network element, first indication information to an access network element includes:

setting, by the mobility management network element, an SRVCC operation possible value to a false value; and sending, by the mobility management network element, the SRVCC operation possible value to the access network element, where the SRVCC operation possible value is used to indicate that the mobility management network element does not support the SRVCC function of the terminal.

With reference to the first aspect, the first possible embodiment of the first aspect, the second possible embodiment of the first aspect, or the third possible embodiment of the first aspect, in a sixth possible embodiment, the prohibiting, by the mobility management network element, an SRVCC function of the terminal includes:

sending, by the mobility management network element, second indication information to the access network element, where the second indication information is used to inform the access network element that the terminal is a roaming terminal and the VoLTE service is to be based on the S8HR communication architecture, so that the access network element prohibits triggering an SRVCC procedure for the terminal.

With reference to the first aspect, the first possible embodiment of the first aspect, the second possible embodiment of the first aspect, or the third possible embodiment of the first aspect, in a seventh possible embodiment, the prohibiting, by the mobility management network element, a single radio voice call continuity SRVCC function of the terminal includes:

when the mobility management network element receives a handover request message that is sent by the access network element for the terminal, and the handover request message is used to trigger an SRVCC handover procedure, rejecting, by the mobility management network element, the handover request message.

With reference to the first aspect, the first possible embodiment of the first aspect, the second possible embodiment of the first aspect, the third possible embodiment of the first aspect, the fourth possible embodiment of the first aspect, the fifth possible embodiment of the first aspect, the sixth possible embodiment of the first aspect, or the seventh possible embodiment of the first aspect, in an eighth possible embodiment, the method further includes:

determining, by the mobility management network element, that the VPLMN supports the SRVCC function of a non-roaming terminal and/or a roaming terminal that does not use the S8HR communication architecture.

According to a second aspect, a voice roaming method is further provided, including:

receiving, by an access network element, indication information sent by a mobility management network element, where the indication information is used to indicate that the mobility management network element does not support a single radio voice call continuity SRVCC function of a terminal, or is used to inform the access network element that the terminal is a roaming terminal and a VoLTE service is to be based on an S8HR communication architecture; and prohibiting, by the access network element according to the indication information, triggering a single radio voice call continuity SRVCC procedure for the terminal.

When determining that the terminal is a roaming terminal and supports the VoLTE service in a roaming network, the mobility management network element prohibits the SRVCC function of the terminal, and notifies the access network element, so that the access network element prohibits triggering the SRVCC procedure for the terminal.

With reference to the second aspect, in a first possible embodiment, the method further includes:

receiving, by the access network element, a bearer setup request sent by the mobility management network element, where the bearer setup request is used to request to set up a VoLTE service bearer for the terminal; and rejecting, by the access network element, the bearer setup request if it is determined that LTE network signal quality of the terminal is less than a specified value.

When a network side does not provide an SRVCC function for a roaming terminal, if necessary, the access network element may convert, to a CSFB call, a VoLTE call that is actively or passively initiated by UE. Therefore, a scenario in which SRVCC is to be triggered for the UE but the network side does not support SRVCC is avoided to the greatest extent, to avoid a problem of call failure and call drop.

According to a third aspect, a voice roaming method is provided, including:

determining, by a mobility management network element, that a terminal is a terminal roaming in a visited public land mobile network VPLMN and the terminal can use a voice over Long Term Evolution VoLTE service in the VPLMN;

determining, by the mobility management network element, that the VPLMN cannot lawfully listen to a VoLTE session of the terminal;

determining, by the mobility management network element, that the terminal is to be lawfully listened on; and if a bearer setup request sent by a core network gateway is received, and the bearer setup request is used to request to set up a VoLTE service bearer for the terminal, rejecting, by the mobility management network element, the bearer setup request.

When the mobility management network element determines that the terminal is a roaming terminal, the VPLMN cannot lawfully listen to the VoLTE session of the terminal, and the mobility management network element determines that the terminal is to be lawfully listened on, the mobility management network element rejects the VoLTE service bearer setup of the terminal. In this way, when the VPLMN cannot lawfully listen to a VoLTE call of the roaming terminal, the mobility management network element can distinguish between roam-in terminals. The VPLMN can provide a normal VoLTE service for most roaming terminals that do not need to be lawfully listened on, so that a VoLTE roaming solution can be commercially used as soon as possible. For few roaming terminals that need to be listened on, the VPLMN converts a VoLTE call setup process of the roaming terminals to a CSFB call setup process, ensuring that the terminal can be listened on in a CS domain by using an existing mechanism, and ensuring that the terminal does not sense the listening.

With reference to the third aspect, in a first possible embodiment, the method further includes:

determining, by the mobility management network element, that the VoLTE service of the terminal is to be based on an S8 interface home routing S8HR communication architecture.

With reference to the first possible embodiment of the third aspect, in a second possible embodiment, the determining, by the mobility management network element, that the VoLTE service of the terminal is to be based on an S8HR communication architecture includes:

obtaining, by the mobility management network element, home public land mobile network HPLMN identifier information of the terminal;

searching, by the mobility management network element, for preset configuration information corresponding to the HPLMN identifier information, where the configuration information includes information about a roaming agreement between the visited public land mobile network VPLMN and an HPLMN corresponding to an HPLMN identifier; and if the information about the S8HR roaming agreement between the HPLMN and the VPLMN is found, determining, by the mobility management network element, that the voice over Long Term Evolution VoLTE service of the terminal is to be based on the S8HR communication architecture.

With reference to the first possible embodiment of the third aspect, in a third possible embodiment, the determining, by the mobility management network element, that the VoLTE service of the terminal is to be based on an S8HR communication architecture includes:

obtaining, by the mobility management network element, subscription data of the terminal; and determining, by the mobility management network element according to the subscription data, that the VoLTE service of the terminal is to be based on the S8HR communication architecture.

With reference to the third aspect, the first possible embodiment of the third aspect, the second possible embodiment of the third aspect, or the third possible embodiment of the third aspect, in a fourth possible embodiment, the determining, by the mobility management network element, that the VPLMN cannot lawfully listen to a VoLTE session of the terminal includes:

on a basis that the VPLMN does not deploy a lawful listening function for an S8HR communication architecture, determining, by the mobility management network element, that the VPLMN cannot lawfully listen to the VoLTE session of the terminal.

With reference to the third aspect, the first possible embodiment of the third aspect, the second possible embodiment of the third aspect, or the third possible embodiment of the third aspect, in a fifth possible embodiment, the determining, by the mobility management network element, that the VPLMN cannot lawfully listen to a VoLTE session of the terminal includes:

determining, by the mobility management network element, that the VPLMN cannot lawfully listen to the VoLTE session of the terminal, on a basis that VoLTE call signaling and/or session content between the terminal and the home public land mobile network HPLMN are/is encrypted.

With reference to the fifth possible embodiment of the third aspect, in a sixth possible embodiment, the determining, by the mobility management network element, that the VPLMN cannot lawfully listen to the VoLTE session of the terminal, on a basis that VoLTE call signaling and/or session content between the terminal and the HPLMN are/is encrypted includes:

receiving, by the mobility management network element, first indication information sent by a network device of the HPLMN, where the first indication information is used to indicate that the VoLTE session of the terminal or VoLTE sessions of all S8HR roaming terminals from the HPLMN are encrypted or encryption is not disabled;

determining, by the mobility management network element, that the VoLTE call signaling and/or the session content between the terminal and the HPLMN are/is encrypted; and determining, by the mobility management network element, that the VPLMN cannot lawfully listen to the VoLTE session of the terminal.

With reference to the fifth possible embodiment of the third aspect, in a seventh possible embodiment, the determining, by the mobility management network element, that the VPLMN cannot lawfully listen to the VoLTE session of the terminal, on a basis that VoLTE call signaling and/or session content between the terminal and the HPLMN are/is encrypted includes:

receiving, by the mobility management network element, second indication information sent by a lawful listening execution device, where the second indication information is used to indicate that the VoLTE session of the terminal is encrypted or encryption is not disabled;

determining, by the mobility management network element, that the VoLTE call signaling and/or the session content between the HPLMN and the terminal or all S8HR roaming terminals from the HPLMN are/is encrypted; and determining, by the mobility management network element, that the VPLMN cannot lawfully listen to the VoLTE session of the terminal.

According to a fourth aspect and a fifth aspect, a mobility management network element is further provided, where the mobility management network element has functions for implementing actions of the mobility management network element in the foregoing methods. The functions may be implemented by using hardware, or may be implemented by using hardware executing corresponding software. The hardware or software includes one or more modules corresponding to the foregoing functions.

According to the fourth aspect, a mobility management network element is provided, including: a processor, where the processor is configured to determine that a terminal is a terminal roaming in a visited public land mobile network VPLMN and the terminal can use a voice over Long Term Evolution VoLTE service in the VPLMN; and the processor is further configured to prohibit a single radio voice call continuity SRVCC function of the terminal.

With reference to the fourth aspect, in a first possible embodiment, the processor is further configured to determine that the VoLTE service of the terminal is to be based on an S8 interface home routing S8HR communication architecture.

With reference to the first possible embodiment of the fourth aspect, in a second possible embodiment, the processor is specifically configured to obtain home public land mobile network HPLMN identifier information of the terminal;

the processor is further specifically configured to search for preset configuration information corresponding to the HPLMN identifier information, where the configuration information includes information about a roaming agreement between the visited public land mobile network VPLMN and an HPLMN corresponding to an HPLMN identifier; and if the information about the S8HR roaming agreement between the HPLMN and the VPLMN is found, the processor is further specifically configured to determine that the VoLTE service of the terminal is to be based on the S8HR communication architecture.

With reference to the first possible embodiment of the fourth aspect, in a third possible embodiment, the processor is specifically configured to obtain subscription data of the terminal; and the processor is further specifically configured to determine, according to the subscription data, that the VoLTE service of the terminal is to be based on the S8HR communication architecture.

With reference to the fourth aspect, the first possible embodiment of the fourth aspect, the second possible embodiment of the fourth aspect, or the third possible embodiment of the fourth aspect, in a fourth possible embodiment, the mobility management network element further includes a transmitter, where the transmitter is configured to send first indication information to an access network element, where the first indication information is used to indicate that the mobility management network element does not support the SRVCC function of the terminal.

With reference to the fourth possible embodiment of the fourth aspect, in a fifth possible embodiment, the processor is specifically configured to set an SRVCC operation possible value to a false value; and the transmitter is specifically configured to send the SRVCC operation possible value to the access network element, where the SRVCC operation possible value is used to indicate that the mobility management network element does not support the SRVCC function of the terminal.

With reference to the fourth aspect, the first possible embodiment of the fourth aspect, the second possible embodiment of the fourth aspect, or the third possible embodiment of the fourth aspect, in a sixth possible embodiment, the mobility management network element further includes a transmitter, where the transmitter is configured to send second indication information to the access network element, where the second indication information is used to inform the access network element that the terminal is a roaming terminal and the VoLTE service is to be based on the S8HR communication architecture, so that the access network element prohibits triggering an SRVCC procedure for the terminal.

With reference to the fourth aspect, the first possible embodiment of the fourth aspect, the second possible embodiment of the fourth aspect, or the third possible embodiment of the fourth aspect, in a seventh possible embodiment, when a handover request message that is sent by the access network element for the terminal is received, and the handover request message is used to trigger an SRVCC handover procedure, the processor is configured to reject the handover request message.

With reference to the fourth aspect, the first possible embodiment of the fourth aspect, the second possible embodiment of the fourth aspect, the third possible embodiment of the fourth aspect, the fourth possible embodiment of the fourth aspect, the fifth possible embodiment of the fourth aspect, the sixth possible embodiment of the fourth aspect, or the seventh possible embodiment of the fourth aspect, in an eighth possible embodiment, the processor is further configured to determine that the VPLMN supports the SRVCC function of a non-roaming terminal and/or a roaming terminal that does not use the S8HR communication architecture.

According to the fifth aspect, a mobility management network element is provided, including:

a determining unit, configured to determine that a terminal is a terminal roaming in a visited public land mobile network VPLMN and the terminal can use a voice over Long Term Evolution VoLTE service in the VPLMN; and a prohibition unit, configured to prohibit a single radio voice call continuity SRVCC function of the terminal.

With reference to the fifth aspect, in a first possible embodiment, the determining unit is further configured to determine that the VoLTE service of the terminal is to be based on an S8 interface home routing S8HR communication architecture.

With reference to the first possible embodiment of the fifth aspect, in a second possible embodiment, the determining unit is specifically configured to:

obtain home public land mobile network HPLMN identifier information of the terminal;

search for preset configuration information corresponding to the HPLMN identifier information, where the configuration information includes information about a roaming agreement between the visited public land mobile network VPLMN and an HPLMN corresponding to an HPLMN identifier; and if the information about the S8HR roaming agreement between the HPLMN and the VPLMN is found, determine that the VoLTE service of the terminal is to be based on the S8HR communication architecture.

With reference to the first possible embodiment of the fifth aspect, in a third possible embodiment, the determining unit is specifically configured to:

obtain subscription data of the terminal; and determine, according to the subscription data, that the VoLTE service of the terminal is to be based on the S8HR communication architecture.

With reference to the fifth aspect, the first possible embodiment of the fifth aspect, the second possible embodiment of the fifth aspect, or the third possible embodiment of the fifth aspect, in a fourth possible embodiment, the mobility management network element further includes:

a sending unit, configured to send first indication information to an access network element, where the first indication information is used to indicate that the mobility management network element does not support the SRVCC function of the terminal.

With reference to the fourth possible embodiment of the fifth aspect, in a fifth possible embodiment, the mobility management network element further includes:

a setting unit, configured to set an SRVCC operation possible value to a false value, where the sending unit is specifically configured to send the SRVCC operation possible value to the access network element, where the SRVCC operation possible value is used to indicate that the mobility management network element does not support the SRVCC function of the terminal.

With reference to the fifth aspect, the first possible embodiment of the fifth aspect, the second possible embodiment of the fifth aspect, or the third possible embodiment of the fifth aspect, in a sixth possible embodiment, the mobility management network element further includes:

a sending unit, configured to send second indication information to the access network element, where the second indication information is used to inform the access network element that the terminal is a roaming terminal and the VoLTE service is to be based on the S8HR communication architecture, so that the access network element prohibits triggering an SRVCC procedure for the terminal.

With reference to the fifth aspect, the first possible embodiment of the fifth aspect, the second possible embodiment of the fifth aspect, or the third possible embodiment of the fifth aspect, in a seventh possible embodiment, the prohibition unit is specifically configured to:

when a handover request message that is sent by the access network element for the terminal is received, and the handover request message is used to trigger an SRVCC handover procedure, reject the handover request message.

With reference to the fifth aspect, the first possible embodiment of the fifth aspect, the second possible embodiment of the fifth aspect, the third possible embodiment of the fifth aspect, the fourth possible embodiment of the fifth aspect, the fifth possible embodiment of the fifth aspect, the sixth possible embodiment of the fifth aspect, or the seventh possible embodiment of the fifth aspect, in an eighth possible embodiment, the determining unit is further configured to determine that the VPLMN supports the SRVCC function of a non-roaming terminal and/or a roaming terminal that does not use the S8HR communication architecture.

A sixth aspect and a seventh aspect further provide an access network element, where the access network element has functions for implementing actions of the access network element in the foregoing methods. The functions may be implemented by using hardware, or may be implemented by using hardware executing corresponding software. The hardware or software includes one or more modules corresponding to the foregoing functions.

According to the sixth aspect, an access network element is further provided, including: a receiver and a processor, where the receiver is configured to receive indication information sent by a mobility management network element, where the indication information is used to indicate that the mobility management network element does not support a single radio voice call continuity SRVCC function of a terminal, or is used to inform the access network element that the terminal is a roaming terminal and a VoLTE service is to be based on an S8HR communication architecture; and the processor is configured to prohibit, according to the indication information, triggering a single radio voice call continuity SRVCC procedure for the terminal.

With reference to the sixth aspect, in a first possible embodiment, the receiver is further configured to receive a bearer setup request sent by the mobility management network element, where the bearer setup request is used to request to set up a VoLTE service bearer for the terminal; and the processor is further configured to reject the bearer setup request if it is determined that LTE network signal quality of the terminal is less than a specified value.

According to the seventh aspect, an access network element is further provided, including:

a receiving unit, configured to receive indication information sent by a mobility management network element, where the indication information is used to indicate that the mobility management network element does not support a single radio voice call continuity SRVCC function of a terminal, or is used to inform the access network element that the terminal is a roaming terminal and a VoLTE service is to be based on an S8HR communication architecture;

a prohibition unit, configured to prohibit, according to the indication information, triggering a single radio voice call continuity SRVCC procedure for the terminal.

With reference to the seventh aspect, in a first possible embodiment, the receiving unit is further configured to receive a bearer setup request sent by the mobility management network element, where the bearer setup request is used to request to set up a VoLTE service bearer for the terminal; and the access network element further includes:

a rejection unit, configured to reject the bearer setup request if it is determined that LTE network signal quality of the terminal is less than a specified value.

According to an eighth aspect and a ninth aspect, a mobility management network element is further provided, where the mobility management network element has functions for implementing actions of the mobility management network element in the foregoing methods. The functions may be implemented by using hardware, or may be implemented by using hardware executing corresponding software. The hardware or software includes one or more modules corresponding to the foregoing functions.

According to the eighth aspect, a mobility management network element is provided, including: a processor, where the processor is configured to determine that a terminal is a terminal roaming in a visited public land mobile network VPLMN and the terminal can use a voice over Long Term Evolution VoLTE service in the VPLMN; and the processor is further configured to determine that the VPLMN cannot lawfully listen to a VoLTE session of the terminal;

the processor is further configured to determine that the terminal is to be lawfully listened on; and the processor is further configured to: if the bearer setup request sent by a core network gateway is received, and the bearer setup request is used to request to set up a VoLTE service bearer for the terminal, reject the bearer setup request.

With reference to the eighth aspect, in a first possible embodiment, the processor is further configured to determine that the VoLTE service of the terminal is to be based on an S8 interface home routing S8HR communication architecture.

With reference to the first possible embodiment of the eighth aspect, in a second possible embodiment, the processor is specifically configured to obtain home public land mobile network HPLMN identifier information of the terminal;

the processor is further specifically configured to search for preset configuration information corresponding to the HPLMN identifier information, where the configuration information includes information about a roaming agreement between the visited public land mobile network VPLMN and an HPLMN corresponding to an HPLMN identifier; and if the information about the S8HR roaming agreement between the HPLMN and the VPLMN is found, the processor is further specifically configured to determine that the voice over Long Term Evolution VoLTE service of the terminal is to be based on the S8HR communication architecture.

With reference to the first possible embodiment of the eighth aspect, in a third possible embodiment, the processor is specifically configured to obtain subscription data of the terminal; and the processor is further specifically configured to determine, according to the subscription data, that the VoLTE service of the terminal is to be based on the S8HR communication architecture.

With reference to the eighth aspect, the first possible embodiment of the eighth aspect, the second possible embodiment of the eighth aspect, or the third possible embodiment of the eighth aspect, in a fourth possible embodiment, on a basis that the VPLMN does not deploy a lawful listening function for an S8HR communication architecture, the processor is specifically configured to determine that the VPLMN cannot lawfully listen to the VoLTE session of the terminal.

With reference to the eighth aspect, the first possible embodiment of the eighth aspect, the second possible embodiment of the eighth aspect, or the third possible embodiment of the eighth aspect, in a fifth possible embodiment, on a basis that VoLTE call signaling and/or session content between the terminal and the home public land mobile network HPLMN are/is encrypted, the processor is specifically configured to determine that the VPLMN cannot lawfully listen to the VoLTE session of the terminal.

With reference to the fifth possible embodiment of the eighth aspect, in a sixth possible embodiment, the mobility management network element further includes: a receiver, where the receiver is configured to receive first indication information sent by a network device of the HPLMN, where the first indication information is used to indicate that the VoLTE session of the terminal or VoLTE sessions of all S8HR roaming terminals from the HPLMN are encrypted or encryption is not disabled;

the processor is further configured to determine that the VoLTE call signaling and/or the session content between the terminal and the HPLMN are/is encrypted; and the processor is further configured to determine that the VPLMN cannot lawfully listen to the VoLTE session of the terminal.

With reference to the fifth possible embodiment of the eighth aspect, in a seventh possible embodiment, the receiver is specifically configured to receive second indication information sent by a lawful listening execution device, where the second indication information is used to indicate that the VoLTE session between the HPLMN and the terminal or all S8HR roaming terminals from the HPLMN is encrypted or encryption is not disabled;

the processor is specifically configured to determine that the VoLTE call signaling and/or the session content between the terminal and the HPLMN are/is encrypted; and the processor is further specifically configured to determine that the VPLMN cannot lawfully listen to the VoLTE session of the terminal.

According to the ninth aspect, a mobility management network element is provided, including:

a determining unit, configured to determine that a terminal is a terminal roaming in a visited public land mobile network VPLMN and the terminal can use a voice over Long Term Evolution VoLTE service in the VPLMN, where the determining unit is further configured to determine that the VPLMN cannot lawfully listen to a VoLTE session of the terminal; and the determining unit is further configured to determine that the terminal is to be lawfully listened on; and a rejection unit, configured to: if a bearer setup request sent by a core network gateway is received, and the bearer setup request is used to request to set up a VoLTE service bearer for the terminal, reject the bearer setup request.

With reference to the ninth aspect, in a first possible embodiment, the determining unit is further configured to determine that the VoLTE service of the terminal is to be based on an S8 interface home routing S8HR communication architecture.

With reference to the first possible embodiment of the ninth aspect, in a second possible embodiment, the determining unit is specifically configured to:

obtain home public land mobile network HPLMN identifier information of the terminal;

search for preset configuration information corresponding to the HPLMN identifier information, where the configuration information includes information about a roaming agreement between the visited public land mobile network VPLMN and an HPLMN corresponding to an HPLMN identifier; and if the information about the S8HR roaming agreement between the HPLMN and the VPLMN is found, determine that the voice over Long Term Evolution VoLTE service of the terminal is to be based on the S8HR communication architecture.

With reference to the first possible embodiment of the ninth aspect, in a third possible embodiment, the determining unit is specifically configured to:

obtain subscription data of the terminal; and determine, according to the subscription data, that the VoLTE service of the terminal is to be based on the S8HR communication architecture.

With reference to the ninth aspect, the first possible embodiment of the ninth aspect, the second possible embodiment of the ninth aspect, or the third possible embodiment of the ninth aspect, in a fourth possible embodiment, the determining unit is specifically configured to:

on a basis that the VPLMN does not deploy a lawful listening function for an S8HR communication architecture, determine that the VPLMN cannot lawfully listen to the VoLTE session of the terminal.

With reference to the ninth aspect, the first possible embodiment of the ninth aspect, the second possible embodiment of the ninth aspect, or the third possible embodiment of the ninth aspect, in a fifth possible embodiment, the determining unit is specifically configured to:

on a basis that VoLTE call signaling and/or session content between the terminal and the home public land mobile network HPLMN are/is encrypted, determine that the VPLMN cannot lawfully listen to a VoLTE session of the terminal.

With reference to the fifth possible embodiment of the ninth aspect, in a sixth possible embodiment, the mobility management network element includes:

a receiving unit, configured to receive first indication information sent by a network device of the HPLMN, where the first indication information is used to indicate that the VoLTE session of the terminal or VoLTE sessions of all S8HR roaming terminals from the HPLMN are encrypted or encryption is not disabled, where the determining unit is specifically configured to determine that the VoLTE call signaling and/or the session content between the terminal and the HPLMN are/is encrypted; and the determining unit is further specifically configured to determine that the VPLMN cannot lawfully listen to a VoLTE session of the terminal.

With reference to the fifth possible embodiment of the ninth aspect, in a seventh possible embodiment, the mobility management network element further includes:

a receiving unit, configured to receive second indication information sent by a lawful listening execution device, where the second indication information is used to indicate that the VoLTE session between the HPLMN and the terminal or all S8HR roaming terminals from the HPLMN is encrypted or encryption is not disabled, where the determining unit is specifically configured to determine that the VoLTE call signaling and/or the session content between the terminal and the HPLMN are/is encrypted; and the determining unit is further specifically configured to determine that the VPLMN cannot lawfully listen to the VoLTE session of the terminal.

The embodiments of the present invention provide a voice roaming method, a mobility management network element, and an access network element, and beneficial effects are specifically as follows:

When determining that the terminal is a roaming terminal supporting the VoLTE service, the mobility management network element prohibits the SRVCC function of the terminal, and notifies the access network element, so that the access network element prohibits triggering the SRVCC procedure for the terminal, avoiding poor user experience caused because a VoLTE session of the roaming terminal may enter the SRVCC procedure.

When the mobility management network element determines that the terminal is a terminal that roams in the VPLMN and that supports the VoLTE service, the VPLMN cannot lawfully listen to the VoLTE session of the terminal, and the mobility management network element determines that the terminal is to be lawfully listened on, the mobility management network element rejects bearer setup. In this way, when the VPLMN cannot lawfully listen to a VoLTE call of the roaming terminal, the mobility management network element can distinguish between roam-in users. For only a roaming terminal that is to be listened on, the mobility management network element rejects a bearer setup request of the roaming terminal.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 6A and FIG. 6B are a schematic flowchart of still another voice roaming method according to an embodiment of the present invention;

DESCRIPTION OF EMBODIMENTS

Figure 2:
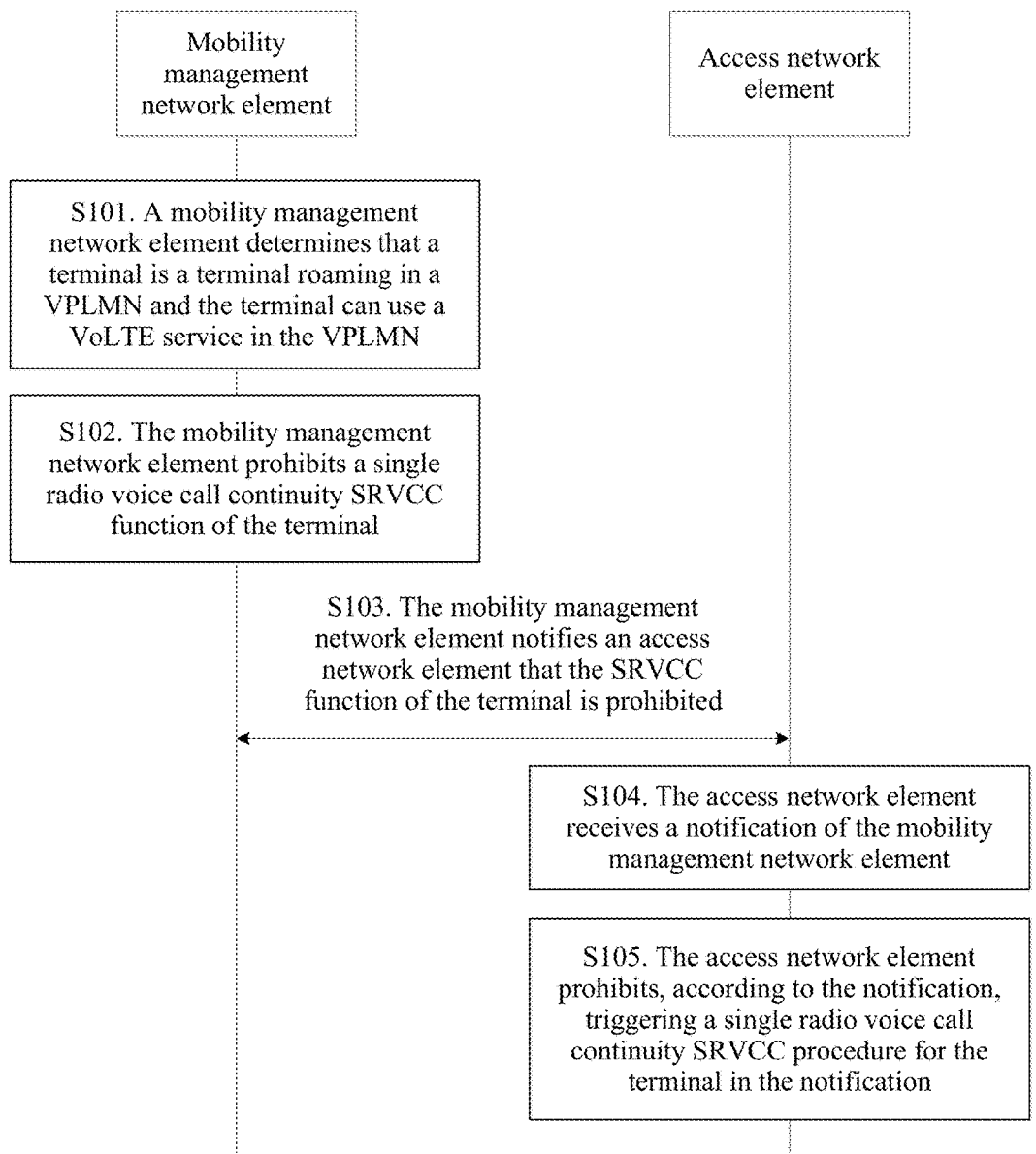
FIG. 2 is a schematic flowchart of a voice roaming method according to an embodiment of the present invention.

FIG. 2 is a schematic flowchart of a voice roaming method according to an embodiment of the present invention. The method includes the following steps.

S101. A mobility management network element determines that a terminal is a terminal roaming in a visited public land mobile network VPLMN and the terminal can use a voice over Long Term Evolution VoLTE service in the VPLMN.

Figure 1:
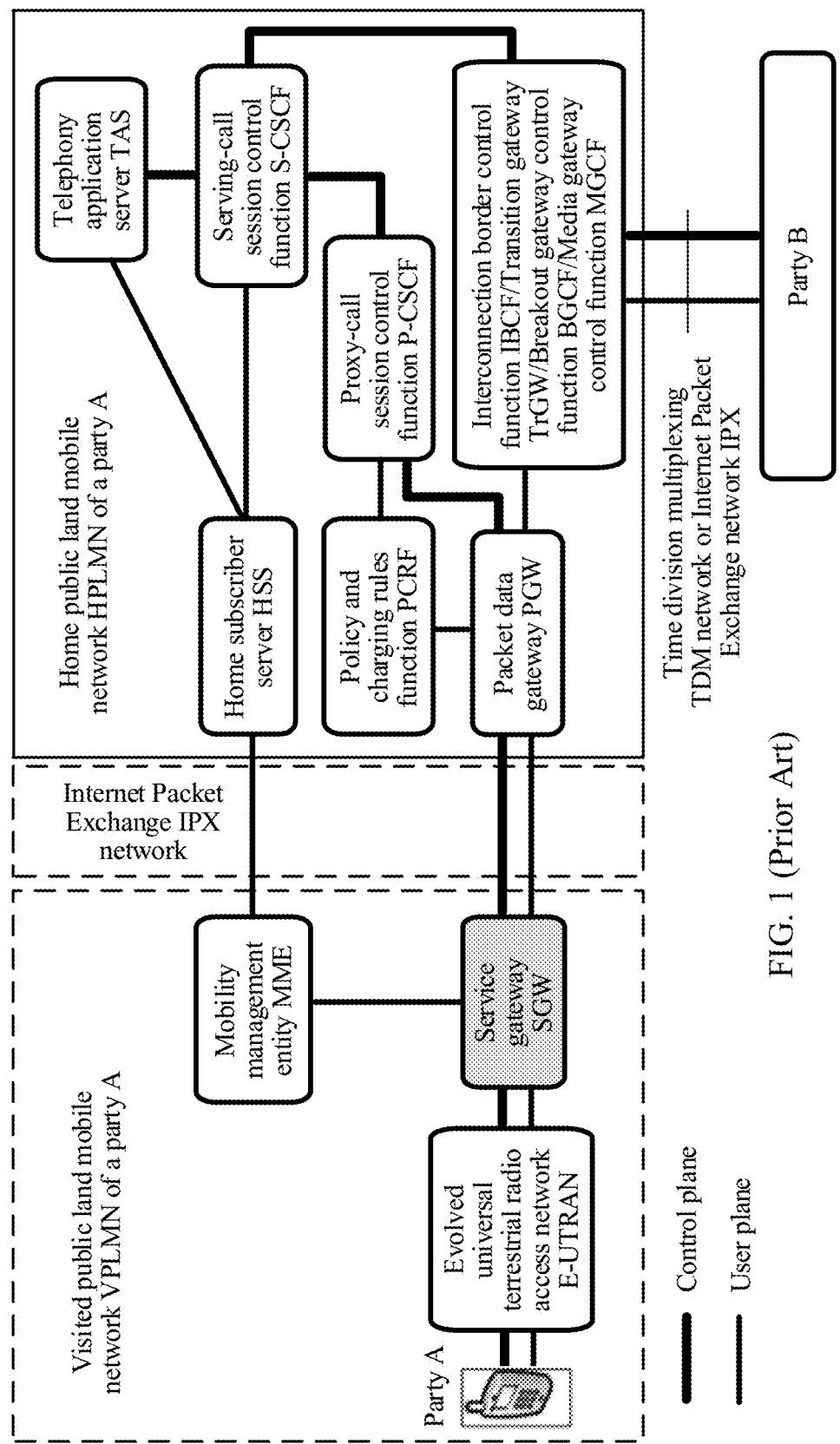
FIG. 1 is a schematic diagram of a VoLTE S8HR architecture.

As shown in FIG. 1, the terminal in this embodiment is a roaming user roaming from an HPLMN to the VPLMN. The roaming terminal initiates evolved packet system (EPS) registration in the VPLMN, and may further need to initiate an IMS registration request message to an IMS network of the HPLMN of the roaming terminal. Therefore, the registration request message includes an EPS registration request message or the IMS registration request message. After receiving the EPS registration request message or the IMS registration request message, the mobility management network element may determine that the terminal is a terminal that roams in the VPLMN and that can use the VoLTE service in the VPLMN. In this embodiment, the mobility management network element is located in the VPLMN, and may be a mobility management entity (MME).

S102. The mobility management network element prohibits an SRVCC function of the terminal.

If a roaming terminal when originally performing the VoLTE service enters an area with poor LTE coverage, and LTE signal quality in this area is not high enough to continuously support a VoLTE session requirement of the terminal, an access network element triggers an SRVCC handover procedure to hand over a VoLTE session of the terminal to a conventional 2G/3G CS session to continue the conventional 2G/3G CS session, ensuring that a voice conversation of a user is not interrupted. According to a standard, it is required that voice interrupt latency caused in an entire handover process cannot exceed 300 ms. However, in a roaming case, an SRVCC handover of the terminal probably cannot meet the standard requirement. Therefore, when determining that the terminal is a terminal that roams in the VPLMN and that supports the VoLTE service, the mobility management network element prohibits the SRVCC function of the terminal, so as to avoid that the access network element triggers the SRVCC handover procedure of the terminal.

S103. The mobility management network element sends indication information to the access network element.

After determining that the SRVCC function of the terminal is prohibited, the mobility management network element sends the indication information to the access network element. The indication information is used to indicate that the mobility management network element does not support the SRVCC function of the terminal, and/or is used to inform the access network element that the terminal is a roaming terminal and the VoLTE service is to be based on an S8HR communication architecture. In some systems, when the VoLTE service is performed based on the S8HR communication architecture, regardless of what operations are performed, the SRVCC handover cannot meet a standard latency requirement.

S104. The access network element receives the indication information sent by the mobility management network element.

S105. The access network element prohibits, according to the indication information, triggering an SRVCC procedure for the terminal.

After receiving the indication information sent by the mobility management network element, the access network element prohibits triggering the SRVCC procedure for the terminal, so as to avoid that the access network element triggers the SRVCC handover procedure for the terminal.

In an alternative manner of S103 to S105, the mobility management network element may not send indication information to the access network element. Instead, when the mobility management network element receives a handover request message that is sent by the access network element for the terminal, and the handover request message is used to trigger the SRVCC handover procedure, the mobility management network element rejects the handover request message, and the access network element does not need to perform any operation.

According to the voice roaming method provided in this embodiment of the present invention, when determining that the terminal is a roaming terminal and supports the VoLTE service in a roaming network, the mobility management network element prohibits the SRVCC function of the terminal, and notifies the access network element, so that the access network element prohibits triggering the SRVCC procedure for the terminal.

Figure 3:
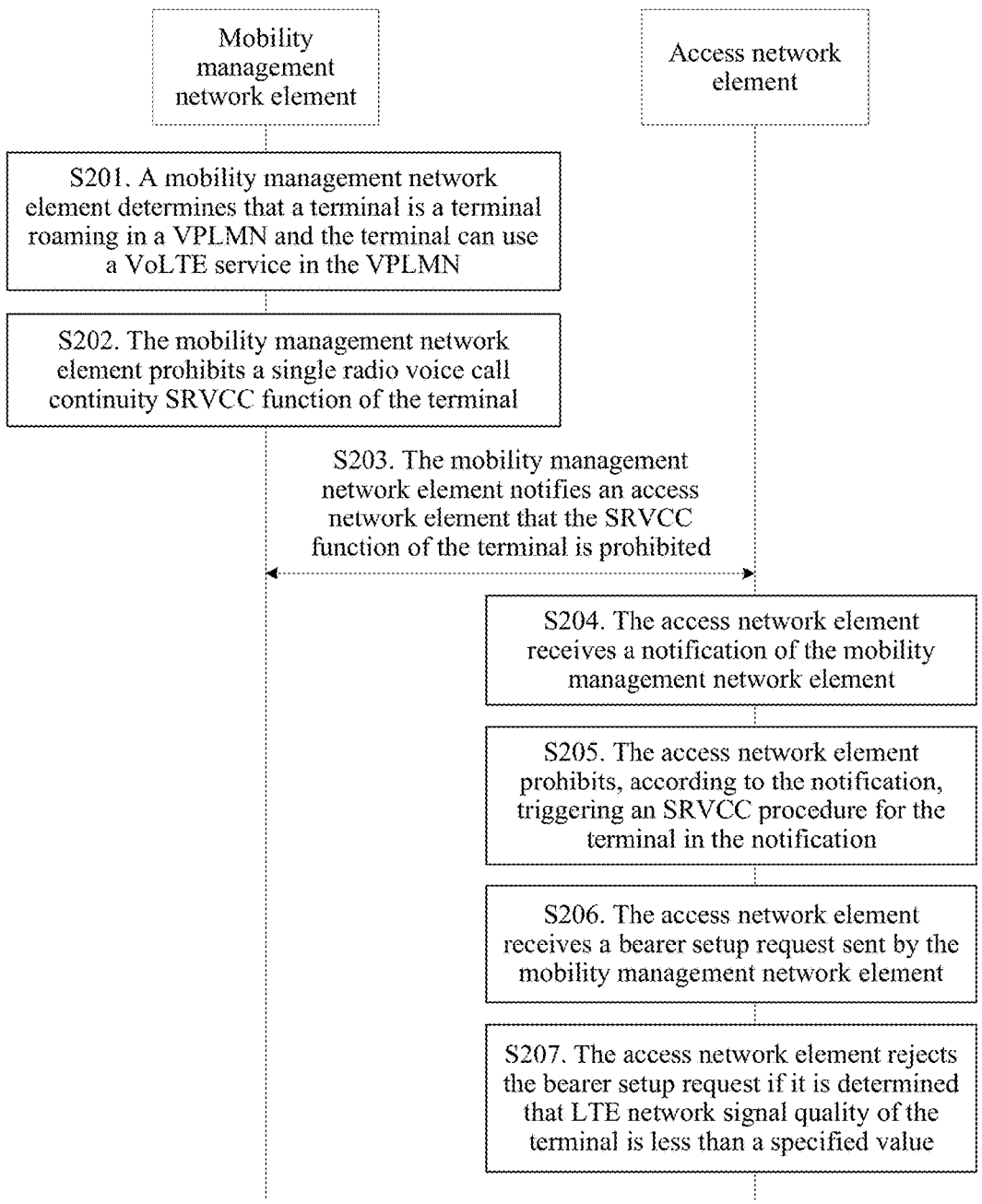
FIG. 3 is a schematic flowchart of another voice roaming method according to an embodiment of the present invention.

FIG. 3 is a schematic flowchart of another voice roaming method according to an embodiment of the present invention. The method includes the following steps.

S201. A mobility management network element in a VPLMN receives a registration request message of a terminal.

When initiating a registration procedure in an EPS network in the VPLMN, a roaming terminal sends an EPS registration request message (EPS attach request)/a tracking area update (TAU) request message to the mobility management network element in the VPLMN.

It should be noted that, generally, when both a network side and a terminal side support a VoLTE service and a circuit switched fallback (CSFB) service, the terminal sets an attach type information element/an EPS update type information element in the EPS attach request message/TAU request message to combined EPS/IMSI attach/combined tracking area/location area update. The attach type information element/EPS update type information element is used to inform the network side that the terminal requests registration both in an EPS domain in a 4G network and in a CS domain in a 2G/3G network.

After initiating EPS registration in the VPLMN, the roaming terminal may further need to initiate an IMS registration request message to an IMS network in an HPLMN of the roaming terminal. The registration request message in step 201 includes the EPS registration request message or the IMS registration request message.

S202. The mobility management network element determines that the terminal is a terminal that roams in the VPLMN and that supports a VoLTE service.

After receiving the EPS registration request message or the IMS registration request message, the mobility management network element may determine that the terminal is a terminal that roams in the VPLMN and that supports the VoLTE service. For example, the mobility management network element may obtain a terminal identifier according to the EPS registration request message, the IMS registration request message, or user subscription data obtained in a registration procedure, and determine whether the terminal identifier belongs to a local terminal identifier range covered by the VPLMN, so as to determine that the terminal is a roaming terminal. The mobility management network element may further obtain an HPLMN identifier of the terminal according to the EPS registration request message, the IMS registration request message, or the user subscription data obtained in the registration procedure, and determine whether the HPLMN identifier is the same as the VPLMN identifier, so as to determine that the terminal is a roaming terminal.

The mobility management network element may specifically determine, in the following one manner or a combination of the following manners, that the terminal can use the VoLTE service in the VPLMN:

1. The mobility management network element may determine, according to the user subscription data obtained in the registration procedure, whether the terminal can use the VoLTE service in the VPLMN. The registration procedure herein may be an EPS registration procedure or an IMS registration procedure. For example, in the EPS registration procedure, if the mobility management network element may obtain indication information that is included in the subscription data of the terminal and that indicates that the terminal can use the VoLTE service in the VPLMN, the mobility management network element can determine, according to the indication information, that the terminal can use the VoLTE service in the VPLMN. For another example, in the IMS registration procedure, the mobility management network element may determine, according to an STN-SR included in the obtained user subscription data, that the terminal can use the VoLTE service in the VPLMN.

2. The mobility management network element may determine whether a VoLTE roaming agreement or configuration information of allowing the HPLMN terminal to be provided with the VoLTE service exists between the VPLMN and the HPLMN of the terminal. Accordingly, the mobility management network element determines whether the terminal can use the VoLTE service in the VPLMN.

S203. The mobility management network element determines that the VoLTE service of the terminal is to be based on an S8 interface home routing S8HR communication architecture.

That is, in this embodiment, the roaming terminal that supports the VoLTE service includes an S8HR roaming terminal, and the S8HR roaming terminal is a roaming terminal that is to use an S8HR communication mechanism to perform VoLTE.

In an embodiment of step S203, step S203 includes:

obtaining, by the mobility management network element, the HPLMN identifier of the terminal; and searching, by the mobility management network element, for preset configuration information corresponding to HPLMN identifier information, where the configuration information includes information about a roaming agreement between the visited public land mobile network VPLMN and the HPLMN corresponding to the HPLMN identifier; and if the information about the S8HR roaming agreement between the HPLMN and the VPLMN is found, determining, by the mobility management network element, that the VoLTE service of the terminal is to be based on the S8HR communication architecture.

In this embodiment, if the information about the S8HR roaming agreement used between the VPLMN and another public land mobile network (PLMN) is preconfigured in the mobility management network element, the mobility management network element may perform determining according to the configuration information. Specifically, when receiving the registration request message of the terminal, the mobility management network element identifies the HPLMN ID of the terminal, and the mobility management network element queries internal configuration information by using the HPLMN ID. If the S8HR roaming agreement is configured between the VPLMN and the HPLMN, the mobility management network element determines that the terminal is an S8HR roaming terminal. In another case, when it is configured by default in the VPLMN that roaming terminals from another HPLMN all provide an S8HR VoLTE roaming service, the VPLMN does not need to obtain the HPLMN ID of the terminal but directly determines, according to the configuration information, that the terminal is an S8HR roaming terminal.

In another embodiment of step S203, step S203 includes:

obtaining, by the mobility management network element, subscription data of the terminal; and determining, by the mobility management network element according to the subscription data, that the VoLTE service of the terminal in the VPLMN is to be based on the S8HR communication architecture.

In this embodiment, the mobility management network element performs determining according to the subscription data of the terminal. The subscription data of the terminal may or may not include specific indication information. The mobility management network element can accordingly determine that the terminal is an S8HR roaming terminal.

In one case, no specific indication information is included. For example, in some systems, if the home network HPLMN and the visited network VPLMN of the terminal agree to perform VoLTE by using a local breakout (LBO) architecture, a visited address allowed (VAA) flag is set in the subscription data of the terminal for an IMS access point name (APN) of the VPLMN, to indicate that the terminal can make a VoLTE call in the VPLMN by using an LBO roaming architecture. In contrast, in this embodiment of the present invention, if the mobility management network element determines that the subscription data of the terminal does not include the VAA flag for the IMS APN of the VPLMN, it can be determined that the terminal is an S8HR roaming terminal.

In another case, the specific indication information is included. That is, the subscription data of the terminal in this embodiment of the present invention is enhanced, and indication information indicating whether the S8HR roaming agreement is used for a VPLMN is added to the subscription data. If the mobility management network element determines that the subscription data of the terminal includes the indication information indicating that the S8HR roaming agreement is used for the VPLMN, it can be determined that the terminal is an S8HR roaming terminal.

For other specific indication information, the mobility management network element performs determining according to a specific session transfer number for SRVCC (STN-SR). The specific STN-SR may be a number in a specific coding manner, for example, an all 1 number. In this embodiment of the present invention, an IMS network device (specifically, for example, a P-CSCF/ATCF) in the HPLMN in which the terminal is located is enhanced. The IMS network device in the HPLMN determines, in the IMS registration process of the terminal (the terminal initiates an IMS registration request message in the VPLMN, and the registration request message is transmitted to the IMS network of the HPLMN), that the terminal is an S8HR roam-out user (specifically, the IMS network device determines that the terminal has roamed outside a current HPLMN, and the VoLTE service is to be performed by using the S8HR roaming architecture between the current HPLMN and a roaming VPLMN of the terminal). The IMS network device allocates a specific STN-SR to the terminal, and the specific STN-SR is transmitted to an HSS and is finally transmitted to the mobility management network element in the VPLMN. In this case, the mobility management network element can determine, according to the specific STN-SR (what is received is usually a common STN-SR), that the terminal is an S8HR roaming terminal. In another embodiment of the present invention, the HPLMN may initialize, in the HSS in advance, STN-SR of all subscribed terminals, and set the STN-SR to specific STN-SRs. When the terminal initiates registration to the IMS network of the HPLMN, if the IMS network device of the HPLMN determines that the terminal is a non-S8HR roam-out user, and the IMS network device allocates a new non-specific STN-SR to the terminal. In contrast, if the IMS network device of the HPLMN determines that the terminal is an S8HR roam-out user, the STN-SR of the terminal keeps unchanged. Similar to some systems, the STN-SR corresponding to the terminal is transmitted to the mobility management network element of the VPLMN in the IMS registration process, and the mobility management network element can determine, according to the specific STN-SR, that the terminal is an S8HR roaming terminal.

Further, the mobility management network element determines that the VPLMN supports an SRVCC function for a non-roaming terminal and/or a roaming terminal that does not use the S8HR communication architecture.

S204. The mobility management network element prohibits a single radio voice call continuity SRVCC function of the terminal.

In an embodiment of step S204, step S204 includes:

sending, by the mobility management network element, first indication information to an access network element, where the first indication information is used to indicate that the mobility management network element does not support the SRVCC function of the terminal.

Specifically, the sending, by the mobility management network element, first indication information to an access network element, where the first indication information is used to indicate that the mobility management network element does not support the SRVCC function of the terminal includes:

setting, by the mobility management network element, an SRVCC operation possible value to a false value; and sending, by the mobility management network element, the SRVCC operation possible value to the access network element, where the SRVCC operation possible value is used to indicate that the access network element does not support the SRVCC function for the terminal.

In this embodiment, for an S8HR terminal, the mobility management network element sets the SRVCC operation possible value to the false value (for example, false or impossible), and sends the updated value to the access network element, to inform the access network element that an SRVCC operation for the terminal is not supported. It should be noted that the value may also be a false value originally, so that the value does not need to be updated during setting. In some systems, after receiving the false SRVCC operation possible value, the access network element does not trigger an SRVCC procedure for the terminal in all conditions. The mobility management network element may specifically send the false value of the SRVCC operation possible value to the access network element in a message such as an initial UE context setup request/a UE context update request (UE context modification)/downlink non-access stratum transport (downlink NAS transport).

In another embodiment of step S204, step S204 includes:

sending, by the mobility management network element, second indication information to the access network element, where the second indication information is used to inform the access network element that the terminal is a roaming terminal and the VoLTE service is to be based on the S8HR communication architecture, so that the access network element prohibits triggering an SRVCC procedure for the terminal.

In this embodiment, the mobility management network element sends the indication information to the access network element. The indication information is used to inform the access network element that the terminal is an S8HR terminal, so that the access network element prohibits triggering the SRVCC procedure for the S8HR terminal in all cases. The mobility management network element may specifically send the indication information to the access network element in a message such as initial UE context setup/UE context modification/downlink NAS transport.

S205. The mobility management network element sends indication information to the access network element.

S206. The access network element receives the indication information sent by the mobility management network element.

S207. The access network element prohibits, according to the indication information, triggering the single radio voice call continuity SRVCC procedure for the terminal.

S208. The access network element receives a bearer setup request sent by the mobility management network element, where the bearer setup request is used to request to set up a VoLTE service bearer for the terminal.

S209. The access network element rejects the bearer setup request if it is determined that LTE network signal quality of the terminal is less than a specified value.

Further, to reduce a probability that the terminal subsequently really is to trigger the SRVCC, in a process of setting up a VoLTE call (including calling or being called) of the terminal, the access network element receives a VoLTE service bearer (a specific QCI of the bearer is usually equal to 1, and the QCI (QoS Class Identifier) is a metric that is used to measure specific packet forwarding action provided to a service data stream) setup request sent by a core network. In this case, the access network element is to determine an uplink signal quality parameter and/or a downlink signal quality parameter in an LTE network in which the terminal is located. The specific uplink signal quality parameter includes at least one of strength of an uplink signal of the terminal, a signal-to-noise ratio of an uplink signal of the terminal, or an uplink packet loss rate of the terminal. The specific downlink signal quality parameter includes at least one of strength of a downlink signal of the terminal, a signal-to-noise ratio of a downlink signal of the terminal, or a downlink packet loss rate of the terminal.

When the uplink signal quality parameter and/or the downlink signal quality parameter is less than a preset value, the access network element rejects the bearer setup request in which QCI=1. Specifically, the bearer setup request in which QCI=1 may be rejected by using a response message. Further, the response message may further carry a specific cause value. The cause value may be specifically: radio resources not available, failure in the radio interface procedure, or not supported QCI value. Alternatively, the cause value may be a cause value whose standard is not defined. This is not limited herein.

In some systems, after the rejection message is transmitted to the IMS network by using an EPS core network, the IMS network sends a 380/503 message to the terminal in a terminal calling scenario, and triggers the terminal to re-initiate a CSFB calling procedure; or the IMS network sends a 380/503 message to a called domain selection device in a scenario in which the terminal is called, triggers the called domain selection device to select a CS domain as a called domain, and initiates a CSFB called procedure for the terminal. This ensures that when the terminal initiates a VoLTE call when LTE signal quality is not very desirable (it is very possible that the SRVCC procedure is to be triggered subsequently), the VoLTE call is rejected, and the call is converted to CSFB, radically avoiding or reducing an opportunity that the SRVCC is to be triggered subsequently, and avoiding call drop experience caused because the network side does not provide the SRVCC function. For the 380/503 message, 380 and 503 are specific Session Initiation Protocol (SIP) response message codes. Herein, 380 indicates a replacement service, and 503 indicates that the service is not provided. The two can be combined to one message, and the message is used to trigger the terminal or the network side to initiate a CSFB procedure.

Figure 4:
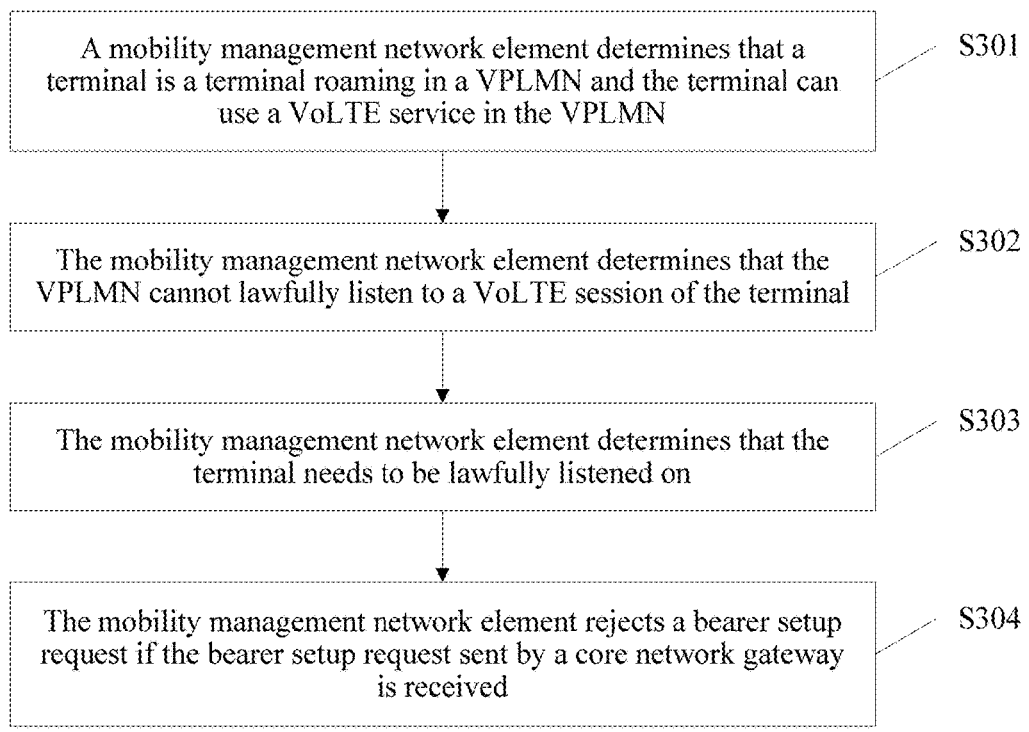
FIG. 4 is a schematic flowchart of converting VoLTE call to CSFB.

A specific procedure of converting calling VoLTE to CSFB is shown in FIG. 4, and the procedure includes the following steps:

1. The terminal sends an invite message to the IMS network device (P-CSCF), to request to initiate a VoLTE call procedure. The P-CSCF sets up a calling VoLTE session for the terminal, and sends the invite message to a subsequent network node and a peer terminal.

2. The peer terminal may reply with a response, the P-CSCF may receive a 183 response message, and the P-CSCF sends the response message to a calling terminal.

3. The P-CSCF triggers a policy and charging rules function (PCRF) to initiate IP-CAN session setup to an EPS network device (PGW). Refer to four messages of an AAR, an RAR, an RAA, and an AAA in FIG. 5.

4. The PGW triggers, to an SGW according to a PCRF indication, a bearer setup process in which QCI=1. The bearer is subsequently used to transmit a VoLTE service data packet. That is, a channel is established for transmitting VoLTE service data.

5. The SGW initiates, to the mobility management network element, the bearer setup request in which QCI=1, and the mobility management network element sends, to an ENB, the bearer setup request in which QCI=1.

6. If the ENB determines that current LTE signal quality of the terminal is less than a specified value, the ENB rejects the bearer setup request in which QCI=1, where the bearer setup request carries a specific cause value.

7. A bearer setup rejection message is transferred to the P-CSCF through the mobility management network element and the SGW/PGW. The bearer setup rejection message includes a specific cause value. The specific cause value may be set.

8. After receiving the rejection message including the specific cause value, the P-CSCF sends the 380/503 message to the terminal. If the 183 message is received previously, the P-CSCF further is to send a cancel message to a subsequent network node, to cancel a peer session.

9. After receiving the 380/503 message, the terminal automatically initiates the CSFB calling procedure.

Figure 5A:
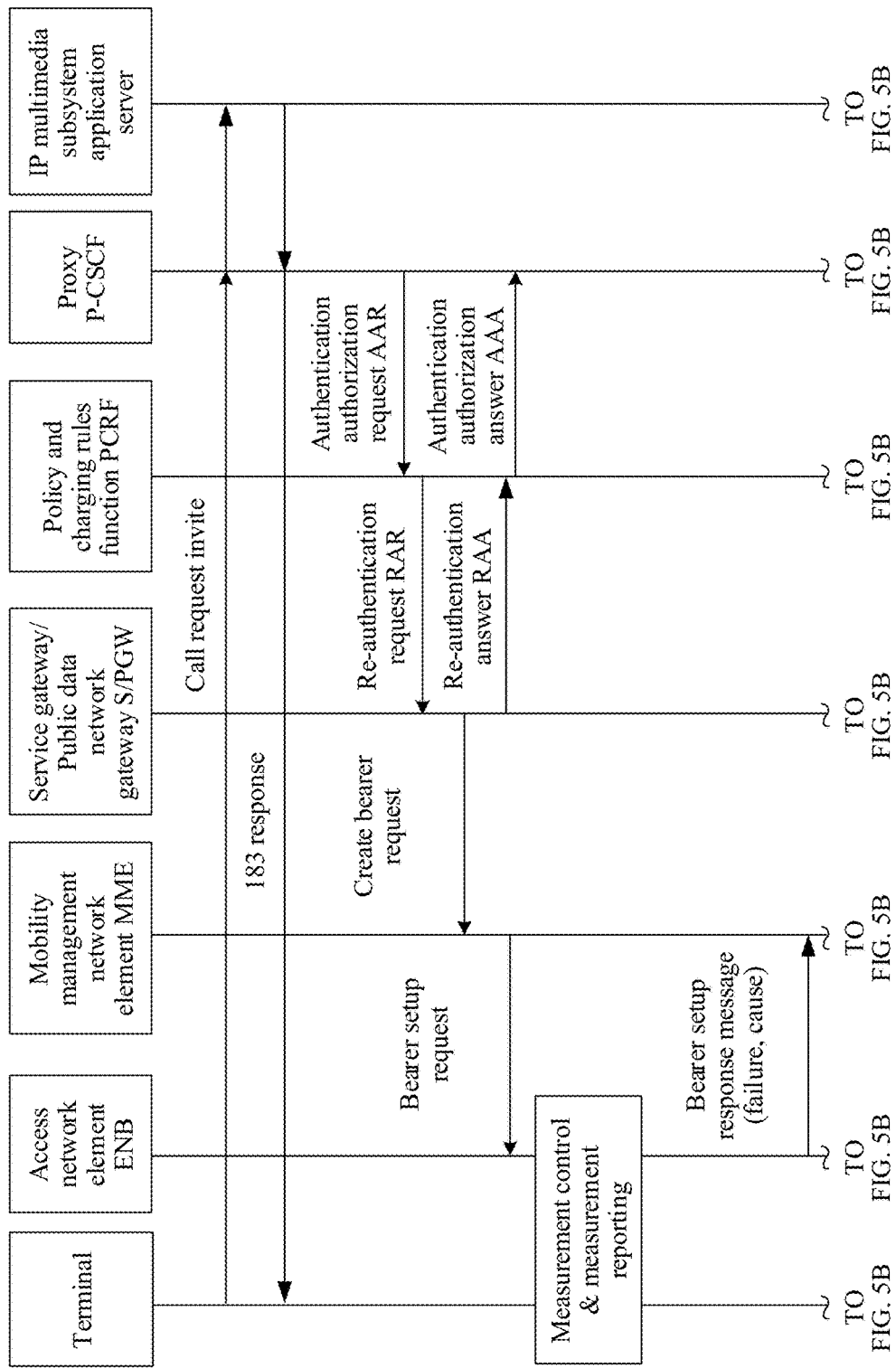
FIG. 5A and FIG. 5B are a schematic flowchart of converting called VoLTE to CSFB.
Figure 5B:
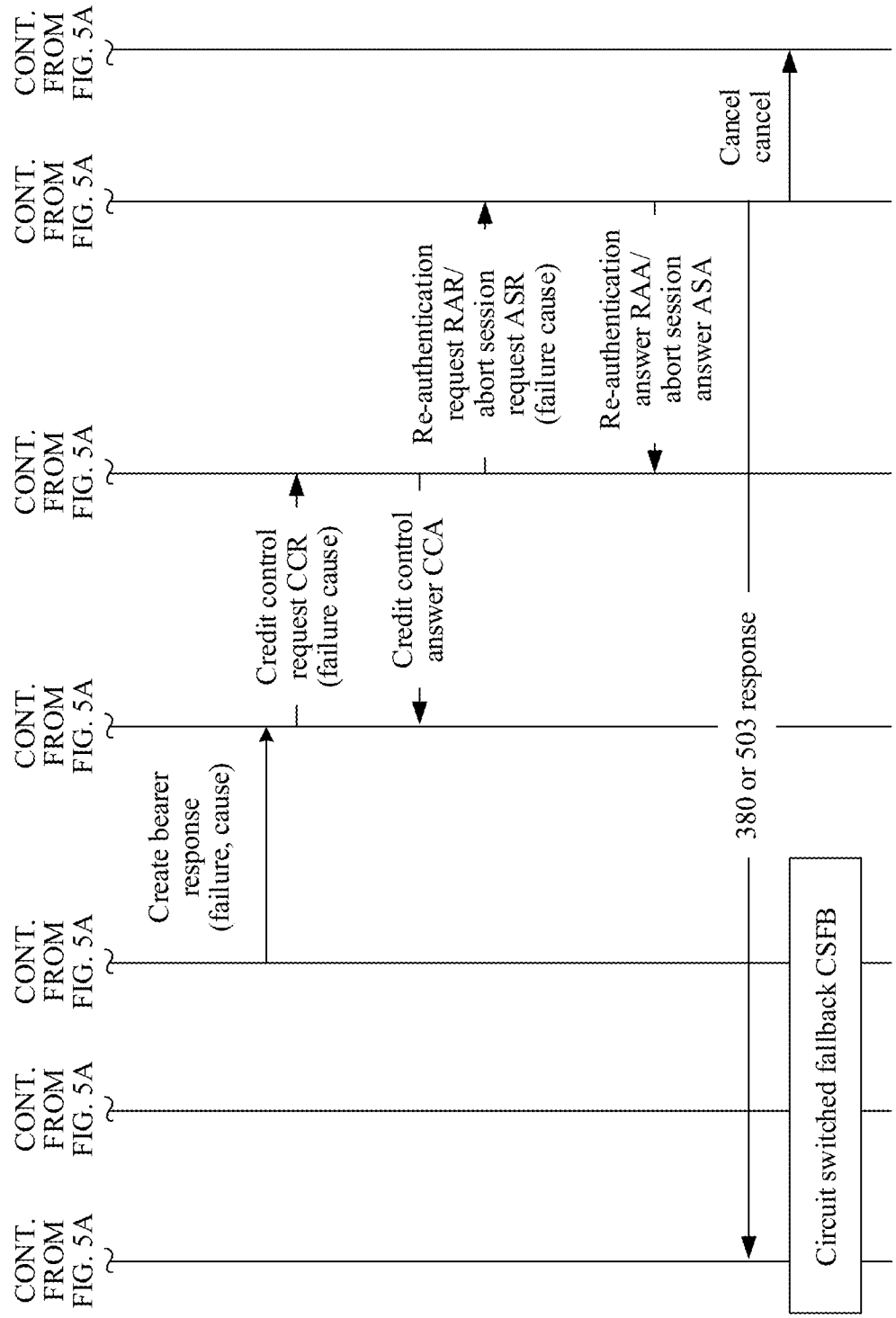

A called procedure is similar to the foregoing calling procedure. FIG. 5A and FIG. 5B show a procedure of converting called VoLTE to CSFB. The procedure includes the following steps:

1. After receiving an invite message sent by another node in the IMS network, the IMS network device P-CSCF sets up a called VoLTE session for a called terminal, and sends the invite message to the called terminal.

2. After receiving a call request, the terminal replies with a 183 response message.

3. The P-CSCF triggers an IP-CAN session setup procedure to the PCRF. This is the same as the calling procedure.

4. The PGW triggers a bearer setup procedure in which QCI=1.

5. After an ENB receives the bearer setup request message in which QCI=1, current LTE signal quality of the called terminal is to be determined. This is the same as the calling procedure. If the signal quality is less than a specified value, the bearer setup request in which QCI=1 is rejected.

6. After receiving a rejection message, the P-CSCF sends a 380/503 message to a called domain selection device in the IMS network, and the called domain selection device retriggers a CSFB called procedure for the terminal.

The terminal and the EPS network perform an existing CSFB called procedure.

According to the voice roaming method provided in this embodiment of the present invention, when determining that the terminal is a roaming terminal that supports the VoLTE service in a visited network and the VoLTE service is to be based on the S8HR communication architecture, the mobility management network element in the visited network prohibits the SRVCC function of the terminal, and notifies the access network element, so that the access network element prohibits triggering the SRVCC procedure for the terminal, avoiding poor user experience to the user caused by the SRVCC function in the current S8HR roaming architecture. When the network side does not provide the SRVCC function for the roaming terminal, if necessary, the access network element may convert, to a CSFB call, a VoLTE call that is actively or passively initiated by UE. Therefore, a scenario in which SRVCC is to be triggered for the UE but the network side does not support SRVCC is avoided to the greatest extent, to avoid a problem of call failure and call drop.

Currently, most countries and/or governments legally require that the VPLMN can lawfully listen to a roam-in user if necessary. However, in the foregoing S8HR roaming architecture, a VoLTE call session triggered by the roaming terminal is connected to an IMS core network of the HPLMN by using the EPS network of the VPLMN as a bearer, call signaling and session content are encrypted between the terminal and the IMS network. Therefore, the VPLMN cannot lawfully listen to the VoLTE call initiated by a roam-in S8HR terminal, or listening is very difficult.

Figure 6A:
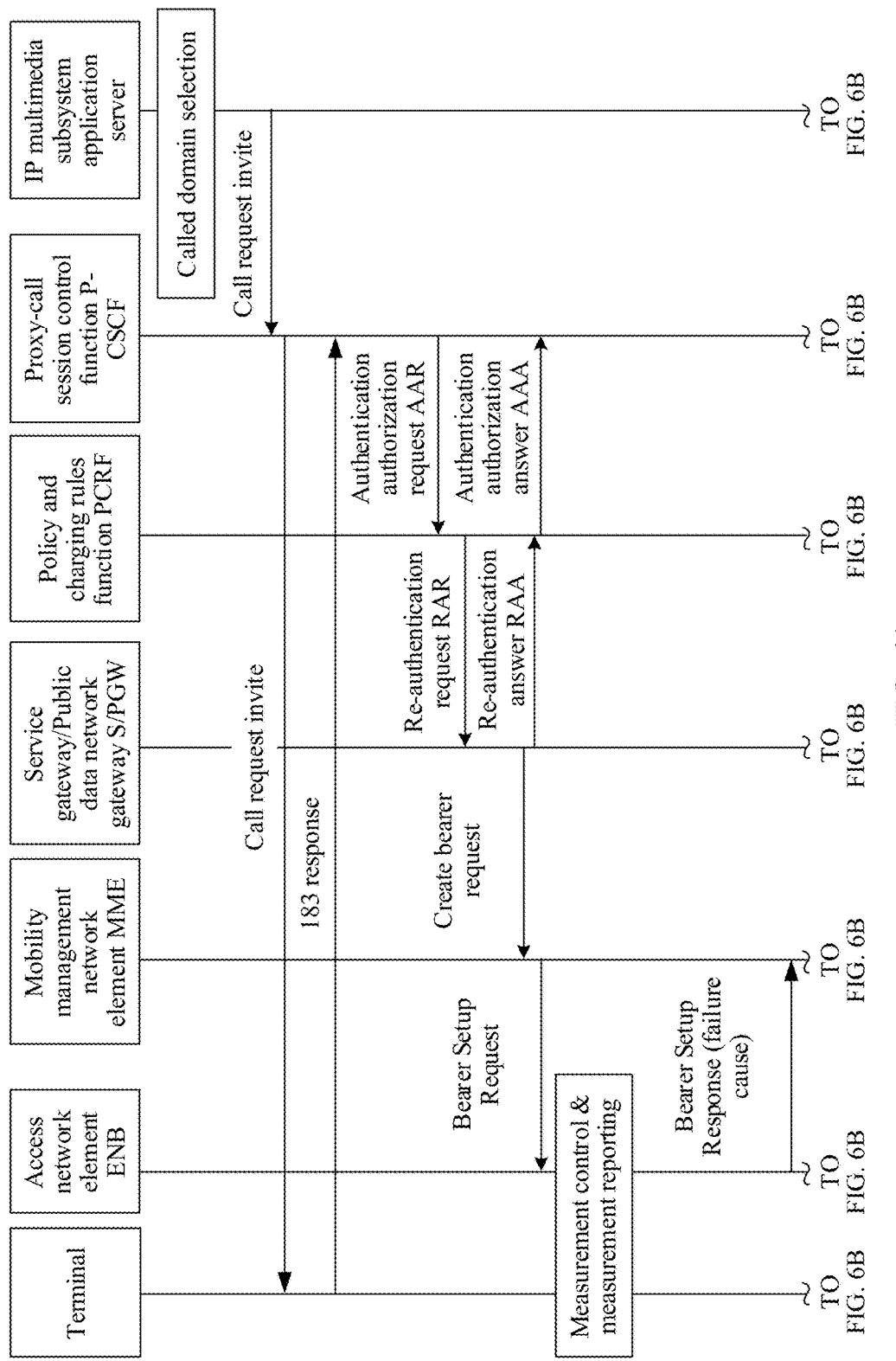

FIG. 6A and FIG. 6B are a schematic flowchart of still another voice roaming method according to an embodiment of the present invention. The method includes the following steps:

S301. A mobility management network element determines that a terminal is a terminal roaming in a visited public land mobile network VPLMN and the terminal can use a voice over Long Term Evolution VoLTE service in the VPLMN.

Specifically, for a process in which the mobility management network element determines that the terminal is a terminal roaming in the visited public land mobile network VPLMN and the terminal can use the voice over Long Term Evolution VoLTE service in the VPLMN, refer to step S101 in the embodiment shown in FIG. 2, or step S201 and step S202 in the embodiment shown in FIG. 3.

In an embodiment, further, the mobility management network element may further determine that the VoLTE service of the terminal is to be based on the S8HR communication architecture. For details, refer to step S203 in the embodiment shown in FIG. 3.

S302. The mobility management network element determines that the VPLMN cannot lawfully listen to a VoLTE session of the terminal.

The mobility management network element is to determine whether the VPLMN can lawfully listen to the VoLTE session of the terminal. An example in which the VoLTE service is to be based on the S8HR communication architecture is used below to describe how the mobility management network element determines that the VPLMN cannot lawfully listen to the VoLTE session of the terminal. In an embodiment of step S302, step S302 includes:

on a basis that the VPLMN does not deploy a lawful listening function for an S8HR roaming architecture, determining, by the mobility management network element, that the VPLMN cannot lawfully listen to the VoLTE session of the terminal.

In this embodiment, the mobility management network element determines that the VPLMN does not deploy the lawful listening function for the S8HR roaming architecture. For example, determining may be performed on a basis that a function of listening to signaling and data related to the VoLTE session is not deployed on devices such as an SGW in the VPLMN and the access network element.

In another embodiment of step S302, step S302 includes:

determining, by the mobility management network element, that the VPLMN cannot lawfully listen to the VoLTE session of the terminal, on a basis that VoLTE call signaling and/or session content between the terminal and an HPLMN are/is encrypted.

Specifically, the determining, by the mobility management network element, that the VPLMN cannot lawfully listen to the VoLTE session of the terminal, on a basis that VoLTE call signaling and/or session content between the terminal and an HPLMN are/is encrypted includes:

receiving, by the mobility management network element, first indication information sent by a network device of the HPLMN, where the first indication information is used to indicate that the VoLTE session of the terminal or VoLTE sessions of all S8HR roaming terminals from the HPLMN are encrypted or encryption is not disabled;

determining, by the mobility management network element, that the VoLTE call signaling and/or the session content between the terminal and the HPLMN are/is encrypted; and determining, by the mobility management network element, that the VPLMN cannot lawfully listen to the VoLTE session of the terminal.

Further, specifically, the determining, by the mobility management network element, that the VPLMN cannot lawfully listen to a VoLTE session of the terminal, on a basis that VoLTE call signaling and/or session content between the terminal and an HPLMN are/is encrypted includes:

receiving, by the mobility management network element, second indication information sent by a lawful listening execution device, where the second indication information is used to indicate that the VoLTE session between the HPLMN and the terminal or all S8HR roaming terminals from the HPLMN is encrypted or encryption is not disabled;

determining, by the mobility management network element, that the VoLTE call signaling and/or the session content between the terminal and the HPLMN are/is encrypted; and determining, by the mobility management network element, that the VPLMN cannot lawfully listen to the VoLTE session of the terminal.

In this embodiment, the lawful listening execution device may be specifically the SGW in the VPLMN or the access network element.

S303. The mobility management network element determines that the terminal is to be lawfully listened on.

Specific manners of determining are as follows:

The mobility management network element obtains identity information of the terminal. The identity information includes identifier information such as an international mobile subscriber identity (IMSI) of the terminal or an international mobile equipment identity (IMEI). That the mobility management network element obtains the identity information of the terminal that requests registration belongs to some systems. This is not limited herein. The mobility management network element reports the identity information of the terminal to a related lawful listening execution device (for example, a listening gateway) or a lawful listening control device (for example, a listening center or an administration function (ADMF)). After determining, according to the identity information of the terminal, whether the terminal is to be listened on, the lawful listening execution/control device informs the mobility management network element of a result.

The lawful listening execution/control device actively delivers, to the mobility management network element, identity information of all objects that need to be listened on, and the mobility management network element stores the information. After subsequently obtaining the identity information of the terminal that requests registration, the mobility management network element determines whether the information that is stored in the mobility management network element and that is of the objects that need to be listened on includes the identity information of the terminal. If the information that is stored in the mobility management network element and that is of the objects that need to be listened on includes the identity information of the terminal, it is determined that the terminal is to be listened on.

In the foregoing two manners, whether a direct interface is to exist between the mobility management network element and the lawful listening execution/control device is not limited. When no direct interface exists, the mobility management network element may obtain necessary information from the lawful listening execution/control device by using an intermediate network element.

S304. If the bearer setup request sent by a core network gateway is received, and the bearer setup request is used to request to set up a VoLTE service bearer for the terminal, the mobility management network element rejects a bearer setup request.

When the mobility management network element receives a VoLTE service bearer (a bearer whose QCI is equal to 1) setup request message that is sent by a gateway device (an SGW or a PGW) for the terminal, the mobility management network element rejects the VoLTE service bearer setup request. In some systems, after the rejection message is transmitted to the IMS network, the IMS network sends a 380/503 message to the terminal in a terminal calling initiation scenario, and triggers the terminal to re-initiate a CSFB calling procedure; or the IMS network sends a 380/503 message to a called domain selection device in a scenario in which the terminal is called, triggers the called domain selection device to select a CS domain as a called domain, and initiates a CSFB called procedure for the terminal.

It should be noted that when the S8HR roaming terminal when performing the VoLTE session is dynamically identified as a terminal that is to be lawfully listened on, the mobility management network element does not perform any processing on the VoLTE session performed by the terminal. Instead, after the VoLTE session ends, when a VoLTE session is initiated next time, step S304 is performed. This actually does not conflict with this embodiment of the present invention.

According to the voice roaming method provided in this embodiment of the present invention, when the mobility management network element determines that the terminal is a roaming terminal, the VPLMN cannot lawfully listen to the VoLTE session of the terminal, and the mobility management network element determines that the terminal is to be lawfully listened on, the mobility management network element rejects the VoLTE service bearer setup of the terminal. In this way, when the VPLMN cannot lawfully listen to a VoLTE call of the roaming terminal, the mobility management network element can distinguish between roam-in terminals. The VPLMN can provide a normal VoLTE service for most roaming terminals that do not need to be lawfully listened on, so that a VoLTE roaming solution can be commercially used as soon as possible. For few roaming terminals that need to be listened on, the VPLMN converts a VoLTE call setup process of the roaming terminals to a CSFB call setup process, ensuring that the terminal can be listened on in a CS domain by using an existing mechanism, and ensuring that the terminal does not sense the listening.

It should be noted that, for the foregoing method embodiments, for brief description, the method embodiments are described as a series of action combinations. However, a person skilled in the art shall learn that the present invention is not limited by the described action order. Some steps may be in another order or performed simultaneously according to the present invention. In addition, the person skilled in the art shall also learn that the embodiments described in this specification are all embodiments, and the related actions and modules are not necessarily required in the present invention.

In the foregoing embodiments, description of each embodiment has its emphasis. For a part not specifically described in an embodiment, refer to related description in another embodiment.

The steps in the method in this embodiment of the present invention may be reordered, combined, and deleted according to an actual requirement.

Figure 7:
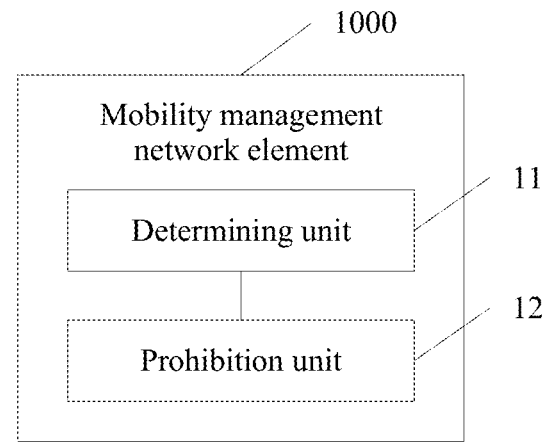
FIG. 7 is a schematic structural diagram of a mobility management network element according to an embodiment of the present invention.

FIG. 7 is a schematic structural diagram of a mobility management network element according to an embodiment of the present invention. The mobility management network element 1000 includes a determining unit 11 and a prohibition unit 12.

The determining unit 11 is configured to determine that a terminal is a terminal that roams in a VPLMN and that supports a VoLTE service.

As shown in FIG. 1, the terminal in this embodiment is a roaming user roaming from an HPLMN to the VPLMN. After initiating EPS registration in the VPLMN, the roaming terminal may further need to initiate an IMS registration request message to an IMS network in an HPLMN of the roaming terminal. Therefore, the registration request message includes an EPS registration request message or the IMS registration request message. After receiving the EPS registration request message or the IMS registration request message, the determining unit 11 may determine that the terminal is a terminal roaming in the visited public land mobile network VPLMN and the terminal can use a voice over Long Term Evolution VoLTE service in the VPLMN. In this embodiment, the mobility management network element is located in the VPLMN, and may be an MME.

The prohibition unit 12 is configured to prohibit an SRVCC function of the terminal.

If a roaming terminal when originally performing the VoLTE service enters an area with poor LTE coverage, and LTE signal quality in the area is not high enough to continuously support a VoLTE session requirement of the terminal, an access network element triggers an SRVCC handover procedure to hand over a VoLTE session of the terminal to a conventional 2G/3G CS session to continue the conventional 2G/3G CS session, ensuring that a voice conversation of a user is not interrupted. According to a standard, it is required that voice interrupt latency caused in an entire handover process cannot exceed 300 ms. However, in a roaming case, SRVCC handover of the terminal probably cannot meet the standard requirement. Therefore, when determining that the terminal is a terminal that roams in the VPLMN and that supports the VoLTE service, the mobility management network element prohibits the SRVCC function of the terminal, so as to avoid that the access network element triggers the SRVCC handover procedure of the terminal.

After determining that the SRVCC function of the terminal is prohibited, the mobility management network element sends indication information to the access network element. The indication information is used to indicate that the mobility management network element does not support the SRVCC function of the terminal, and/or is used to inform the access network element that the terminal is a roaming terminal and the VoLTE service is to be based on an S8HR communication architecture.

In some systems, when the VoLTE service is performed based on the S8HR communication architecture, regardless of what operations are performed, the SRVCC handover cannot meet the standard latency requirement.

According to the mobility management network element provided in this embodiment of the present invention, when determining that the terminal is a roaming terminal that supports the VoLTE service, the mobility management network element prohibits the SRVCC function of the terminal, and notifies the access network element, so that the access network element prohibits triggering the SRVCC procedure for the terminal.

Figure 8:
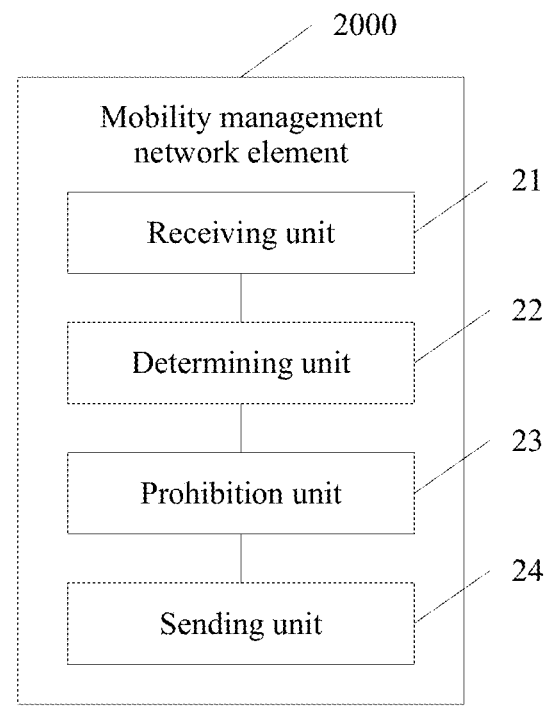
FIG. 8 is a schematic structural diagram of another mobility management network element according to an embodiment of the present invention.

FIG. 8 is a schematic structural diagram of another mobility management network element according to an embodiment of the present invention. The mobility management network element 2000 includes a receiving unit 21, a determining unit 22, and a prohibition unit 23.

The receiving unit 21 is configured to receive a registration request message of a terminal.

When initiating a registration procedure in an EPS network in a VPLMN, a roaming terminal sends an EPS registration request message/a tracking area update request message to the mobility management network element in the VPLMN.

After initiating EPS registration in the VPLMN, the roaming terminal may further need to initiate an IMS registration request message to an IMS network in an HPLMN of the roaming terminal. Therefore, the registration request message includes the EPS registration request message or the IMS registration request message. The determining unit 22 is configured to determine that the terminal is a terminal roaming in the visited public land mobile network VPLMN and the terminal can use a voice over Long Term Evolution VoLTE service in the VPLMN.

After receiving the EPS registration request message or the IMS registration request message, the mobility management network element may determine that the terminal is a terminal that roams in the VPLMN and that supports the VoLTE service.

The determining unit 22 is further configured to determine that the VoLTE service of the terminal is to be based on an S8 interface home routing S8HR communication architecture.

That is, in this embodiment, the roaming terminal that supports the VoLTE service includes an S8HR roaming terminal, and the S8HR roaming terminal is a roaming terminal that is to use an S8HR communication mechanism to perform VoLTE.

In an embodiment, the determining unit 22 is specifically configured to:

obtain an HPLMN identifier of the terminal;

search for preset configuration information corresponding to HPLMN identifier information, where the configuration information includes information about a roaming agreement between the visited public land mobile network VPLMN and an HPLMN corresponding to an HPLMN identifier; and if the information about the S8HR roaming agreement between the HPLMN and the VPLMN is found, determine that the VoLTE service of the terminal is to be based on the S8HR communication architecture.

In this embodiment, if the information about the S8HR roaming agreement used between the VPLMN and another public land mobile network is preconfigured in the mobility management network element, the mobility management network element may perform determining according to the configuration information. Specifically, when receiving the registration request message of the terminal, the mobility management network element identifies the HPLMN ID of the terminal, and the mobility management network element queries internal configuration information by using the HPLMN ID. If the S8HR roaming agreement is configured between the VPLMN and the HPLMN, the mobility management network element determines that the terminal is an S8HR roaming terminal. In another case, when it is configured by default in the VPLMN that roaming terminals from another HPLMN all provide an S8HR VoLTE roaming service, the VPLMN does not need to obtain the HPLMN ID of the terminal but directly determines, according to the configuration information, that the terminal is an S8HR roaming terminal.

In another embodiment, the determining unit 22 is specifically configured to:

obtain subscription data of the terminal; and determine, according to the subscription data, that the VoLTE service of the terminal in the VPLMN is to be based on the S8HR communication architecture.

In this embodiment, the mobility management network element performs determining according to the subscription data of the terminal. The subscription data of the terminal may or may not include specific indication information. The mobility management network element can accordingly determine that the terminal is an S8HR roaming terminal.

In one case, no specific indication information is included. For example, in some systems, if the home network HPLMN and the visited network VPLMN of the terminal agree to perform VoLTE by using a local breakout architecture, a visited address allowed flag flag is set in the subscription data of the terminal for an IMS access point name of the VPLMN, to indicate that the terminal can make a VoLTE call in the VPLMN by using an LBO roaming architecture. In contrast, in this embodiment of the present invention, if the mobility management network element determines that the subscription data of the terminal does not include the VAA flag for the IMS APN of the VPLMN, it can be determined that the terminal is an S8HR roaming terminal.

In another case, the specific indication information is included. That is, the subscription data of the terminal in this embodiment of the present invention is enhanced, and indication information indicating whether the S8HR roaming agreement is used for a VPLMN is added to the subscription data. If the mobility management network element determines that the subscription data of the terminal includes the indication information indicating that the S8HR roaming agreement is used for the VPLMN, it can be determined that the terminal is an S8HR roaming terminal.

For other specific information, the mobility management network element performs determining according to a specific STN-SR. The specific STN-SR may be a number in a specific coding manner, for example, an all 1 number. In this embodiment of the present invention, an IMS network device (specifically, for example, a P-CSCF/ATCF) in the HPLMN in which the terminal is located is enhanced. The IMS network device in the HPLMN determines, in the IMS registration process of the terminal (the terminal initiates an IMS registration request message in the VPLMN, and the registration request message is transmitted to the IMS network of the HPLMN), that the terminal is an S8HR roam-out user (specifically, the IMS network device determines that the terminal has roamed outside a current HPLMN, and the VoLTE service is to be performed by using the S8HR roaming architecture between the current HPLMN and a roaming VPLMN of the terminal). The IMS network device allocates a specific STN-SR to the terminal, and the specific STN-SR is transmitted to an HSS and is finally transmitted to the mobility management network element in the VPLMN. In this case, the mobility management network element can determine, according to the specific STN-SR (what is received is usually a common STN-SR), that the terminal is an S8HR roaming terminal. In another embodiment of the present invention, the HPLMN may initialize, in the HSS in advance, STN-SR of all subscribed terminals, and set the STN-SR to specific STN-SRs. When the terminal initiates registration to the IMS network of the HPLMN, if the IMS network device of the HPLMN determines that the terminal is a non-S8HR roam-out user, and the IMS network device allocates a new non-specific STN-SR to the terminal. In contrast, if the IMS network device of the HPLMN determines that the terminal is an S8HR roam-out user, the STN-SR of the terminal keeps unchanged. Similar to some systems, the STN-SR corresponding to the terminal is transmitted to the mobility management network element of the VPLMN in the IMS registration process, and the mobility management network element can determine, according to the specific STN-SR, that the terminal is an S8HR roaming terminal.

Further, the mobility management network element determines that the VPLMN supports an SRVCC function for a non-roaming terminal and/or a roaming terminal that does not use the S8HR communication architecture.

The prohibition unit 23 is configured to prohibit the single radio voice call continuity SRVCC function of the terminal.

In an embodiment, the mobility management network element 2000 further includes: a sending unit 24.

The sending unit 24 is configured to send first indication information to an access network element, where the first indication information is used to indicate that the mobility management network element does not support the SRVCC function of the terminal.

Specifically, the mobility management network element sets an SRVCC operation possible value to a false value. The mobility management network element sends the SRVCC operation possible value to the access network element. The SRVCC operation possible value is used to indicate that the access network element does not support the SRVCC function of the terminal.

In this embodiment, for an S8HR terminal, the mobility management network element sets the SRVCC operation possible value to the false value (for example, false or impossible), and sends the updated value to the access network element, to inform the access network element that an SRVCC operation for the terminal is not supported. It should be noted that the value may also be a false value originally, so that the value does not need to be updated during setting. In some systems, after receiving the false SRVCC operation possible value, the access network element does not trigger an SRVCC procedure for the terminal in all conditions. The mobility management network element may specifically send the false value of the SRVCC operation possible value to the access network element in a message such as an initial UE context setup request/a UE context update request (UE context modification)/downlink non-access stratum transport (downlink NAS transport).

In another embodiment, The sending unit 24 is configured to send second indication information to the access network element, where the second indication information is used to inform the access network element that the terminal is a roaming terminal and the VoLTE service is to be based on the S8HR communication architecture, so that the access network element prohibits triggering the SRVCC procedure for the terminal.

In this embodiment, the mobility management network element sends the indication information to the access network element. The indication information is used to inform the access network element that the terminal is an S8HR roaming terminal, so that the access network element prohibits triggering the SRVCC procedure for the terminal in all cases. The mobility management network element may specifically send the indication information to the access network element in a message such as initial UE context setup/UE context modification/downlink NAS transport.

In still another embodiment, the prohibition unit 23 is specifically configured to:

when a handover request message that is sent by the access network element for the terminal is received, and the handover request message is used to trigger an SRVCC handover procedure, reject the handover request message.

Certainly, the prohibition unit 23 may be used in a combination of the foregoing manners.

The sending unit 24 is further configured to send the indication information to the access network element.

According to the mobility management network element provided in this embodiment of the present invention, when determining that the terminal is a roaming terminal that supports the VoLTE service and the VoLTE service is to be based on the S8HR communication architecture, the mobility management network element prohibits the SRVCC function of the terminal, and notifies the access network element, so that the access network element prohibits triggering the SRVCC procedure for the terminal, to resolve a problem that an interrupt latency requirement of SRVCC cannot be met in the S8HR roaming architecture currently. When receiving the bearer setup request sent by the mobility management network element, the access network element measures LTE network signal quality of the terminal. If the LTE network signal quality of the terminal is less than a specified value, the access network element rejects the bearer setup message. Therefore, it is ensured that when the terminal initiates the VoLTE call when the LTE signal quality is not very desirable, a VoLTE call is rejected and converted to CSFB, radically avoiding or reducing an opportunity that the SRVCC is to be triggered subsequently, and avoiding call drop experience caused because a network side does not provide the SRVCC function.

Figure 9:
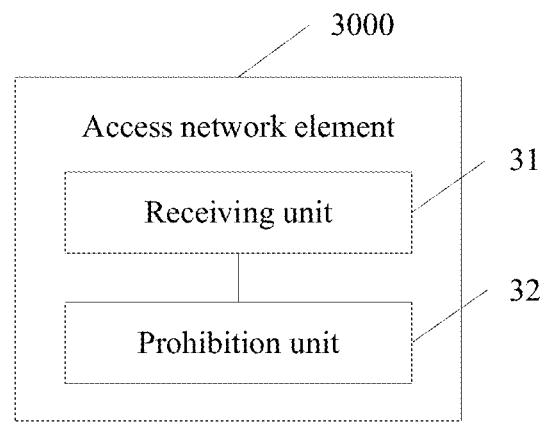
FIG. 9 is a schematic structural diagram of an access network element according to an embodiment of the present invention.

FIG. 9 is a schematic structural diagram of an access network element according to an embodiment of the present invention. The access network element 3000 includes:

a receiving unit 31, configured to receive indication information sent by a mobility management network element; and a prohibition unit 32, configured to prohibit, according to the indication information, triggering an SRVCC procedure for the terminal.

After receiving the indication information sent by the mobility management network element, the access network element prohibits triggering the SRVCC procedure for the terminal. Therefore, that the access network element triggers an SRVCC handover procedure for the terminal is avoided.

According to the access network element provided in this embodiment of the present invention, when determining that the terminal is a roaming terminal that supports the VoLTE service, the mobility management network element prohibits an SRVCC function of the terminal, and notifies the access network element, so that the access network element prohibits triggering the SRVCC procedure for the terminal.

Figure 10:
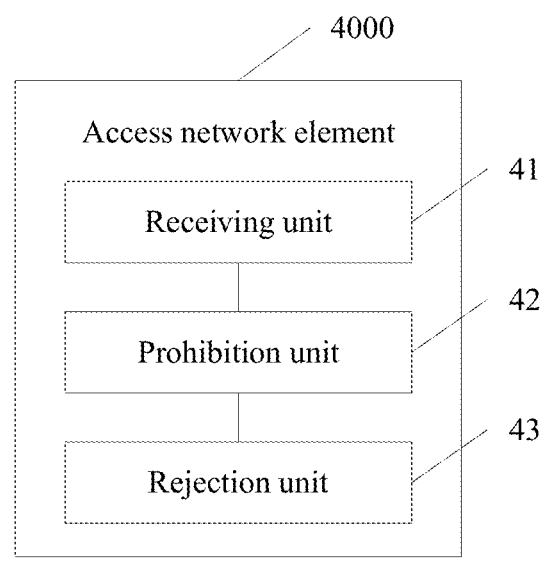
FIG. 10 is a schematic structural diagram of another access network element according to an embodiment of the present invention.

FIG. 10 is a schematic structural diagram of another access network element according to an embodiment of the present invention. The access network element 4000 includes:

a receiving unit 41, configured to receive indication information sent by a mobility management network element;

a prohibition unit 42, configured to prohibit, according to the indication information, triggering a single radio voice call continuity SRVCC procedure for a terminal, where the receiving unit 41 is further configured to receive a bearer setup request sent by the mobility management network element, where the bearer setup request is used to request to set up a VoLTE service bearer for the terminal; and a rejection unit 43, configured to reject the bearer setup request if it is determined that LTE network signal quality of the terminal is less than a specified value.

Further, to reduce a probability that the terminal subsequently really is to trigger the SRVCC, in a process of setting up a VoLTE call (including calling or being called) of the terminal, the access network element receives a VoLTE service bearer (a specific QCI of the bearer is usually equal to 1) setup request sent by a core network. In this case, the access network element is to determine an uplink signal quality parameter and/or a downlink signal quality parameter in an LTE network in which the terminal is located. The specific uplink signal quality parameter includes at least one of strength of an uplink signal of the terminal, a signal-to-noise ratio of an uplink signal of the terminal, or an uplink packet loss rate of the terminal. The specific downlink signal quality parameter includes at least one of strength of a downlink signal of the terminal, a signal-to-noise ratio of a downlink signal of the terminal, or a downlink packet loss rate of the terminal.

When the uplink signal quality parameter and/or the downlink signal quality parameter is less than a preset value, the access network element rejects the bearer setup request in which QCI=1. Specifically, the bearer setup request in which QCI=1 may be rejected by using a response message. Further, the response message may further carry a specific cause value. The cause value may be specifically: radio resources not available, failure in the radio interface procedure, or not supported QCI value. Alternatively, the cause value may be a cause value whose standard is not defined. This is not limited herein.

In some systems, after the rejection message is transmitted to the IMS network by using an EPS core network, the IMS network sends a 380/503 message to the terminal in a terminal calling scenario, and triggers the terminal to re-initiate a CSFB calling procedure; or the IMS network sends a 380/503 message to a called domain selection device in a scenario in which the terminal is called, triggers the called domain selection device to select a CS domain as a called domain, and initiates a CSFB called procedure for the terminal. This ensures that when the terminal initiates a VoLTE call when LTE signal quality is not very desirable (it is very possible that the SRVCC procedure is to be triggered subsequently), the VoLTE call is rejected, and the call is converted to a CSFB, radically avoiding or reducing an opportunity that the SRVCC is to be triggered subsequently, and avoiding call drop experience caused because a network side does not provide the SRVCC function. For the 380/503 message, 380 and 503 are specific Session Initiation Protocol (SIP) response message codes. Herein, 380 indicates a replacement service, and 503 indicates that the service is not provided. The two can be combined to one message, and the message is used to trigger the terminal or the network side to initiate a CSFB procedure.

According to the access network element provided in this embodiment of the present invention, when determining that the terminal is a terminal that roams in the visited network and that can use the VoLTE service in the visited network and the VoLTE service is to be based on an S8HR communication architecture, the mobility management network element in the visited network prohibits the SRVCC function of the terminal, and notifies the access network element, so that the access network element prohibits triggering the SRVCC procedure for the terminal, avoiding poor user experience to the user caused by the SRVCC function in a current S8HR roaming architecture. When the network side does not provide the SRVCC function for the roaming terminal, if necessary, the access network element may convert, to a CSFB call, a VoLTE call that is actively or passively initiated by UE. Therefore, a scenario in which SRVCC is to be triggered for the UE but the network side does not support SRVCC is avoided to the greatest extent, to avoid a problem of call failure and call drop.

Figure 11:
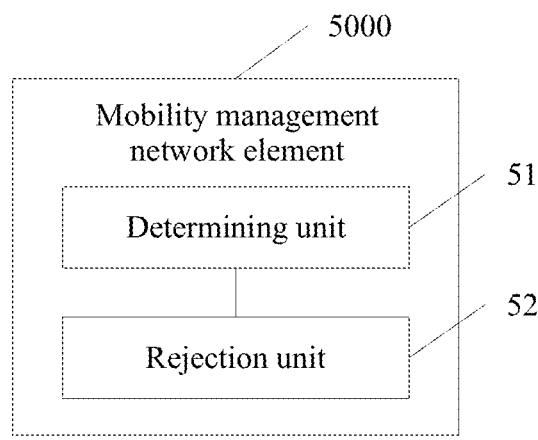
FIG. 11 is a schematic structural diagram of still another mobility management network element according to an embodiment of the present invention.

FIG. 11 is a schematic structural diagram of still another mobility management network element according to an embodiment of the present invention. The mobility management network element 5000 includes:

a determining unit 51, configured to determine that a terminal is a terminal roaming in a visited public land mobile network VPLMN and the terminal can use a voice over Long Term Evolution VoLTE service in the VPLMN.

In an embodiment, further, the determining unit 51 may be further configured to determine that the VoLTE service of the terminal is to be based on an S8HR communication architecture.

Specifically, the determining unit 51 is specifically configured to:

obtain home public land mobile network HPLMN identifier information of the terminal;

search for preset configuration information corresponding to the HPLMN identifier information, where the configuration information includes information about a roaming agreement between the visited public land mobile network VPLMN and an HPLMN corresponding to an HPLMN identifier; and if the information about the S8HR roaming agreement between the HPLMN and the VPLMN is found, determine that the voice over Long Term Evolution VoLTE service of the terminal is to be based on the S8HR communication architecture.

Specifically, the determining unit 51 is specifically configured to:

obtain subscription data of the terminal; and determine, according to the subscription data, that the VoLTE service of the terminal is to be based on the S8HR communication architecture.

The determining unit 51 is further configured to determine that the VPLMN cannot lawfully listen to a VoLTE session of the terminal.

In an embodiment, the determining unit 51 is specifically configured to:

on a basis that the VPLMN does not deploy a lawful listening function for an S8HR roaming architecture, determine that the VPLMN cannot lawfully listen to the VoLTE session of the terminal.

In this embodiment, the mobility management network element determines that the VPLMN does not deploy the lawful listening function for the S8HR roaming architecture. For example, determining may be performed on a basis that the function of listening to signaling and data related to the VoLTE session is not deployed on devices such as an SGW in the VPLMN and the access network element.

In another embodiment, the determining unit 51 is specifically configured to:

determine that the VPLMN cannot lawfully listen to the VoLTE session of the terminal, on a basis that VoLTE call signaling and/or session content between the terminal and the HPLMN are/is encrypted.

Specifically, the mobility management network element further includes a receiving unit (not shown in the figure).

The receiving unit is configured to receive first indication information sent by a network device of the HPLMN, where the first indication information is used to indicate that the VoLTE session of the terminal or VoLTE sessions of all S8HR roaming terminals from the HPLMN are encrypted or encryption is not disabled.

The determining unit is specifically configured to determine that the VoLTE call signaling and/or the session content between the terminal and the HPLMN are/is encrypted.

The determining unit is further specifically configured to determine that the VPLMN cannot lawfully listen to the VoLTE session of the terminal.

Specifically, the receiving unit is further configured to receive second indication information sent by a lawful listening execution device, where the second indication information is used to indicate that the VoLTE session between the HPLMN and the terminal or all S8HR roaming terminals from the HPLMN is encrypted or encryption is not disabled.

The determining unit is specifically configured to determine that the VoLTE call signaling and/or the session content between the terminal and the HPLMN are/is encrypted.

The determining unit is further specifically configured to determine that the VPLMN cannot lawfully listen to the VoLTE session of the terminal.

In this embodiment, the lawful listening execution device may be specifically the SGW in the VPLMN or the access network element.

The determining unit 51 is further configured to determine that the terminal is to be lawfully listened on.

A rejection unit 52 is configured to: if a bearer setup request sent by a core network gateway is received, and the bearer setup request is used to request to set up a VoLTE service bearer for the terminal, reject the bearer setup request.

When the mobility management network element receives a VoLTE voice bearer (a bearer whose QCI is equal to 1) setup request message that is sent by a gateway device (an SGW or a PGW) for the terminal, the mobility management network element rejects the VoLTE voice bearer setup request. In some systems, after the rejection message is transmitted to an IMS network, the IMS network sends a 380/503 message to the terminal, and triggers the terminal to re-initiate a CSFB calling procedure; or an IMS network sends a 380/503 message to a called domain selection device, triggers the called domain selection device to select a CS domain as a called domain, and initiates a CSFB called procedure for the terminal.

According to the mobility management network element provided in this embodiment of the present invention, when the mobility management network element determines that the terminal is a roaming terminal, the VPLMN cannot lawfully listen to the VoLTE session of the terminal, and the mobility management network element determines that the terminal is to be lawfully listened on, the mobility management network element rejects a VoLTE service bearer setup message. In this way, when the VPLMN cannot lawfully listen to a VoLTE call of the terminal, the mobility management network element can distinguish between roam-in users. The VPLMN can provide a normal VoLTE service for most terminals that do not need to be lawfully listened on, so that a VoLTE roaming solution can be commercially used as soon as possible. For few terminals that need to be listened on, the VPLMN converts, to a CSFB call, a VoLTE call initiated by the terminal, ensuring that the terminal can be listened on in a CS domain by using an existing mechanism, and ensuring that the terminal does not sense the listening.

Figure 12:
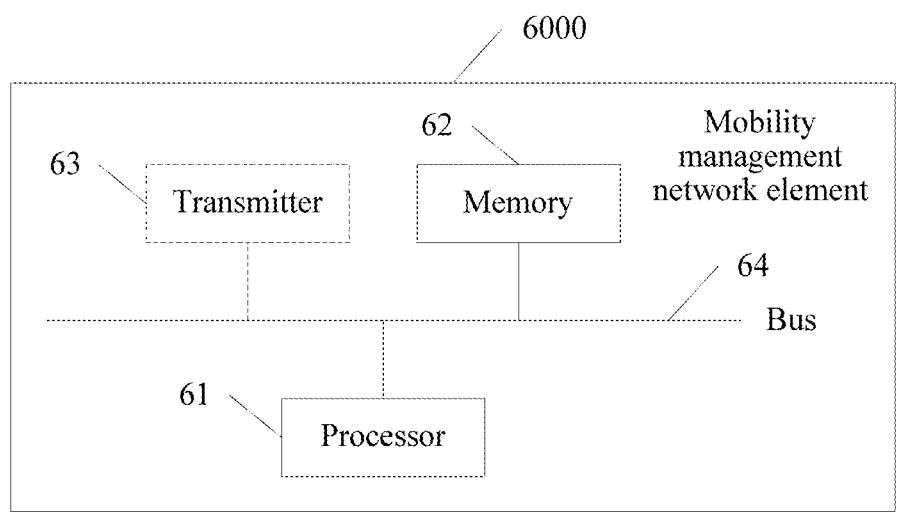
FIG. 12 is a schematic structural diagram of yet another mobility management network element according to an embodiment of the present invention.

FIG. 12 is a schematic structural diagram of yet another mobility management network element according to an embodiment of the present invention. The mobility management network element is configured to implement the foregoing voice roaming function. As shown in FIG. 12, the mobility management network element 6000 includes a processor 61 and a memory 62, and may further include a transmitter 63 (which is indicated by using dashed-line box in the figure). The processor 61, the memory 62, and the transmitter 63 are connected to each other by using a bus 64. The memory 62 stores a computer program, and the processor 61 executes the stored computer program, so that the mobility management network element implements the foregoing voice roaming method.

The processor 61 is configured to determine that a terminal is a terminal roaming in a visited public land mobile network VPLMN and the terminal can use a voice over Long Term Evolution VoLTE service in the VPLMN.

The processor 61 is further configured to prohibit a single radio voice call continuity SRVCC function of the terminal.

In an embodiment, the processor 61 is further configured to determine that the VoLTE service of the terminal is to be based on an S8 interface home routing S8HR communication architecture.

In another embodiment, the processor 61 is specifically configured to obtain home public land mobile network HPLMN identifier information of the terminal.

The processor 61 is further specifically configured to search for preset configuration information corresponding to the HPLMN identifier information, where the configuration information includes information about a roaming agreement between the visited public land mobile network VPLMN and an HPLMN corresponding to an HPLMN identifier.

If the information about the S8HR roaming agreement between the HPLMN and the VPLMN is found, the processor 61 is further specifically configured to determine that the VoLTE service of the terminal is to be based on the S8HR communication architecture.

In still another embodiment, the processor 61 is specifically configured to obtain subscription data of the terminal.

The processor 61 is further specifically configured to determine, according to the subscription data, that the VoLTE service of the terminal is to be based on the S8HR communication architecture.

In yet another embodiment, the transmitter 63 is configured to send first indication information to an access network element, where the first indication information is used to indicate that the mobility management network element does not support the SRVCC function of the terminal.

In a further embodiment, the processor 61 is specifically configured to set an SRVCC operation possible value to a false value.

The transmitter 63 is specifically configured to send the SRVCC operation possible value to the access network element, where the SRVCC operation possible value is used to indicate that the mobility management network element does not support the SRVCC function of the terminal.

In a still further embodiment, the transmitter 63 is configured to send second indication information to the access network element, where the second indication information is used to inform the access network element that the terminal is a roaming terminal and the VoLTE service is to be based on the S8HR communication architecture, so that the access network element prohibits triggering an SRVCC procedure for the terminal.

In a yet further embodiment, the processor 61 is specifically configured to: when a handover request message that is sent by the access network element for the terminal is received, and the handover request message is used to trigger an SRVCC handover procedure, reject the handover request message.

In a still yet further embodiment, the processor 61 is further configured to determine that the VPLMN supports the SRVCC function of a non-roaming terminal and/or a roaming terminal that does not use the S8HR communication architecture.

According to the mobility management network element provided in this embodiment of the present invention, when determining that the terminal is a roaming terminal supporting the VoLTE service, the mobility management network element prohibits the SRVCC function of the terminal, and notifies the access network element, so that the access network element prohibits triggering the SRVCC procedure for the terminal.

Figure 13:
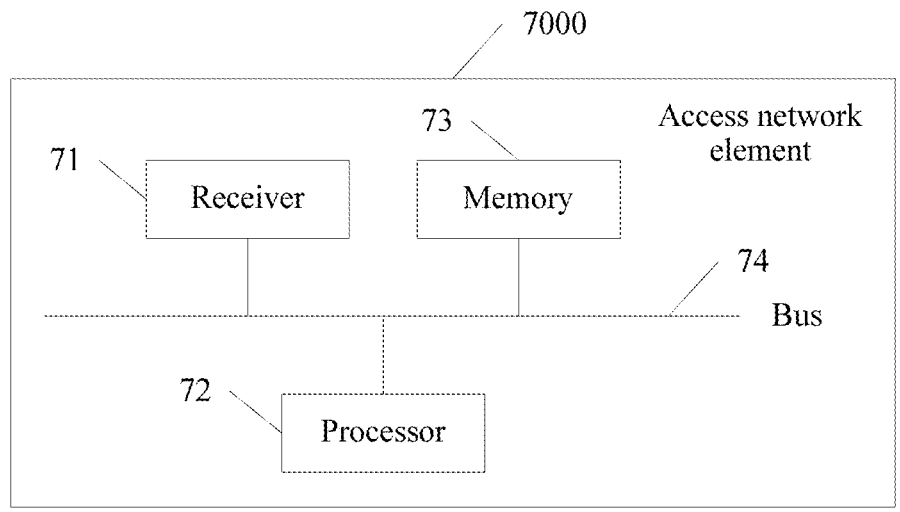
FIG. 13 is a schematic structural diagram of still another access network element according to an embodiment of the present invention.

FIG. 13 is a schematic structural diagram of still another access network element according to an embodiment of the present invention. The access network element is configured to implement the foregoing voice roaming function. As shown in FIG. 13, the access network element 7000 includes a receiver 71, a processor 72, and a memory 73. The receiver 71, the processor 72, and the memory 73 are connected to each other by using a bus 74. The memory 73 stores a computer program, and the processor 72 executes the stored computer program, so that the access network element implements the foregoing voice roaming method.

The receiver 71 is configured to receive indication information sent by a mobility management network element, where the indication information is used to indicate that the mobility management network element does not support a single radio voice call continuity SRVCC function for a terminal, or is used to inform the access network element that the terminal is a roaming terminal and a VoLTE service is to be based on an S8HR communication architecture.

The processor 72 is configured to prohibit, according to the indication information, triggering a single radio voice call continuity SRVCC procedure for the terminal.

In an embodiment, the receiver 71 is further configured to receive a bearer setup request sent by the mobility management network element, where the bearer setup request is used to request to set up a VoLTE service bearer for the terminal.

The processor 72 is further configured to reject the bearer setup request if it is determined that LTE network signal quality of the terminal is less than a specified value.

According to the access network element provided in this embodiment of the present invention, when determining that the terminal is a terminal roaming in a visited public land mobile network VPLMN and the terminal can use the voice over Long Term Evolution VoLTE service in the VPLMN, the mobility management network element prohibits the SRVCC function of the terminal, and notifies the access network element, so that the access network element prohibits triggering the SRVCC procedure for the terminal. When receiving the bearer setup request sent by the mobility management network element, the access network element measures the LTE network signal quality of the terminal. If the LTE network signal quality of the terminal is less than the specified value, the access network element rejects the bearer setup message. Therefore, it is ensured that when the terminal initiates the VoLTE call when the LTE signal quality is not very desirable, a VoLTE call is rejected and converted to CSFB, radically avoiding or reducing an opportunity that the SRVCC is to be triggered subsequently, and avoiding call drop experience caused because the network side does not provide the SRVCC function.

Figure 14:
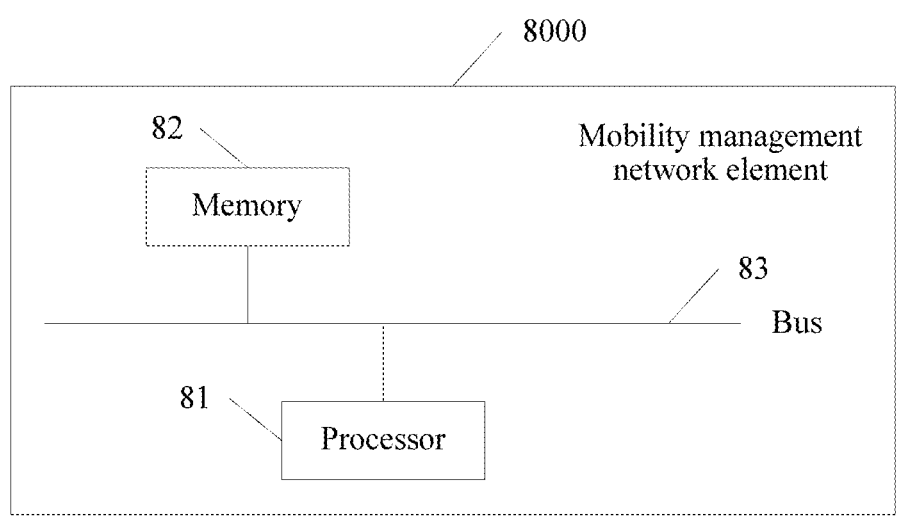
FIG. 14 is a schematic structural diagram of still yet another mobility management network element according to an embodiment of the present invention.

FIG. 14 is a schematic structural diagram of still yet another mobility management network element according to an embodiment of the present invention. The mobility management network element is configured to implement the foregoing voice roaming function. As shown in FIG. 14, the mobility management network element 8000 includes a processor 81 and a memory 82. The processor 81 and a memory 82 are separately connected to the bus 83. The memory 82 stores a computer program, and the processor 81 executes the stored computer program, so that the mobility management network element implements the foregoing voice roaming method.

The processor 81 is configured to determine that a terminal is a terminal roaming in a visited public land mobile network VPLMN and the terminal can use a voice over Long Term Evolution VoLTE service in the VPLMN.

The processor 81 is further configured to determine that the VPLMN cannot lawfully listen to a VoLTE session of the terminal.

The processor 81 is further configured to determine that the terminal is to be lawfully listened on.

The processor 81 is further configured to: if a bearer setup request sent by a core network gateway is received, and the bearer setup request is used to request to set up a VoLTE service bearer for the terminal, reject the bearer setup request.

According to the mobility management network element provided in this embodiment of the present invention, when the mobility management network element determines that the terminal is an S8HR roaming terminal, the VPLMN cannot lawfully listen to the VoLTE session of the terminal, and the mobility management network element determines that the terminal is to be lawfully listened on, the mobility management network element rejects a VoLTE service bearer setup message. In this way, when the VPLMN cannot lawfully listen to a VoLTE call of the S8HR roaming terminal, the mobility management network element can distinguish between S8HR roam-in users. The VPLMN can provide a normal VoLTE service for most S8HR terminals that do not need to be lawfully listened on, so that an S8HR VoLTE roaming solution can be commercially used as soon as possible. For few S8HR terminals that need to be listened on, the VPLMN converts, to a CSFB call, a VoLTE call initiated by the terminal, ensuring that the terminal can be listened on in a CS domain by using an existing mechanism, and ensuring that the terminal does not sense the listening.

Merging, division, and deletion may be performed on the units in the apparatuses in the embodiments of the present invention according to an actual need. A person skilled in the art may combine or integrate the different embodiments described in this specification and features of the different embodiments.

With descriptions of the foregoing embodiments, a person skilled in the art may clearly understand that the present invention may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of the present invention, but is not intended to limit the protection scope of the present invention. Any modification, equivalent replacement, or improvement made without departing from the principle of the present invention shall fall within the protection scope of the present invention.

What is claimed is:

1. A voice roaming method, comprising:
   determining, by a mobility management network element, that a terminal is a terminal roaming from a home public land mobile network (HPLMN) to a visited public land mobile network (VPLMN) in response to a registration request in the VPLMN, wherein the terminal can use a voice over Long Term Evolution (VoLTE) service in the VPLMN; and
   prohibiting, by the mobility management network element, a single radio voice call continuity (SRVCC) function of the terminal in the VPLMN by sending, by the mobility management network element, first indication information to an access network element, wherein the first indication information is used to indicate to the access network element that the mobility management network element of the VPLMN does not support the SRVCC function for the terminal.

2. The method according to claim 1, further comprising:
   determining, by the mobility management network element, that the VoLTE service of the terminal is to be based on an S8 interface home routing (S8HR) communication architecture.

3. The method according to claim 2, wherein the determining, by the mobility management network element, that the VoLTE service of the terminal is to be based on an S8HR communication architecture comprises:
   obtaining, by the mobility management network element, HPLMN identifier information of the terminal;
   searching, by the mobility management network element, for preset configuration information corresponding to the HPLMN identifier information, wherein the preset configuration information comprises information about an S8HR roaming agreement between the VPLMN and the HPLMN corresponding to an HPLMN identifier; and
   if the information about the S8HR roaming agreement between the HPLMN and the VPLMN is found, determining, by the mobility management network element, that the VoLTE service of the terminal is to be based on the S8HR communication architecture.

4. The method according to claim 2, wherein the determining, by the mobility management network element, that the VoLTE service of the terminal is to be based on an S8HR communication architecture comprises:
   obtaining, by the mobility management network element, subscription data of the terminal; and
   determining, by the mobility management network element according to the subscription data, that the VoLTE service of the terminal is to be based on the S8HR communication architecture.

5. The method according to claim 1, wherein the sending, by the mobility management network element, first indication information to an access network element comprises:
setting, by the mobility management network element, an SRVCC operation possible value to a false value; and
sending, by the mobility management network element, the SRVCC operation possible value to the access network element, wherein the SRVCC operation possible value is used to indicate that the mobility management network element does not support the SRVCC function of the terminal.

6. The method according to claim 2, wherein the prohibiting, by the mobility management network element, an SRVCC function of the terminal comprises:
sending, by the mobility management network element, second indication information to the access network element, wherein the second indication information is used to inform the access network element that the terminal is a roaming terminal and the VoLTE service is to be based on the S8HR communication architecture, so that the access network element prohibits triggering an SRVCC procedure for the terminal.

7. The method according to claim 1, wherein the prohibiting, by the mobility management network element, an SRVCC function of the terminal comprises:
when the mobility management network element receives a handover request message that is sent by the access network element for the terminal, and the handover request message is used to trigger an SRVCC handover procedure, rejecting, by the mobility management network element, the handover request message.

8. The method according to claim 1, further comprising:
determining, by the mobility management network element, that the VPLMN supports the SRVCC function of a non-roaming terminal and/or a roaming terminal that does not use the S8HR communication architecture.

9. A mobility management network element, comprising at least one processor and a memory storing a program for execution by the at least one processor, the program comprising instructions for carrying out the following steps:
determining that a terminal is a terminal roaming from a home public land mobile network (HPLMN) to a visited public land mobile network (VPLMN) in response to a registration request in the VPLMN, wherein the terminal can use a voice over Long Term Evolution (VoLTE) service in the VPLMN; and
prohibiting a single radio voice call continuity (SRVCC) function of the terminal in the VPLMN by sending, by a transmitter of the mobility management network element, first indication information to an access network element, wherein the first indication information is used to indicate to the access network element that the mobility management network element of the VPLMN does not support the SRVCC function for the terminal.

10. The mobility management network element according to claim 9, wherein the instructions are further for carrying out the following step:
determining that the VoLTE service of the terminal is to be based on an S8 interface home routing (S8HR) communication architecture.

11. The mobility management network element according to claim 10, wherein the determining that the VoLTE service of the terminal is to be based on an S8HR communication architecture comprises:
obtaining HPLMN identifier information of the terminal;
searching for preset configuration information corresponding to the HPLMN identifier information, wherein the preset configuration information comprises information about an S8HR roaming agreement between the VPLMN and an HPLMN corresponding to an HPLMN identifier; and
if the information about the S8HR roaming agreement between the HPLMN and the VPLMN is found, determining that the VoLTE service of the terminal is to be based on the S8HR communication architecture.

12. The mobility management network element according to claim 10, wherein the determining that the VoLTE service of the terminal is to be based on an S8HR communication architecture comprises:
obtaining subscription data of the terminal; and
determining, according to the subscription data, that the VoLTE service of the terminal is to be based on the S8HR communication architecture.

13. The mobility management network element according to claim 9, wherein the instructions are further for carrying out the following step:
setting an SRVCC operation possible value to a false value; and
utilizing the transmitter to send the SRVCC operation possible value to the access network element, wherein the SRVCC operation possible value is used to indicate that the mobility management network element does not support the SRVCC function of the terminal.

14. The mobility management network element according to claim 10, wherein the prohibiting an SRVCC function of the terminal comprises:
sending second indication information to the access network element, wherein the second indication information is used to inform the access network element that the terminal is a roaming terminal and the VoLTE service is to be based on the S8HR communication architecture, so that the access network element prohibits triggering an SRVCC procedure for the terminal.

15. The mobility management network element according to claim 9, wherein the prohibiting an SRVCC function of the terminal comprises:
when the mobility management network element receives a handover request message that is sent by the access network element for the terminal, and the handover request message is used to trigger an SRVCC handover procedure, rejecting the handover request message.

16. The mobility management network element according to claim 9, wherein the instructions are further for carrying out the following step:
determining that the VPLMN supports the SRVCC function of a non-roaming terminal and/or a roaming terminal that does not use the S8HR communication architecture.

17. An access network element, comprising:
a receiver, configured to receive indication information sent by a mobility management network element visited public land mobile network (VPLMN), wherein the indication information is used to indicate that the mobility management network element does not support a single radio voice call continuity (SRVCC) function of a terminal roaming from a home public land mobile network (HPLMN) to the VPLMN, or is used to inform the access network element that the terminal is a roaming terminal and a voice over Long Term Evolution (VoLTE) service is to be based on an S8 interface home routing (S8HR) communication architecture; and a processor, configured to prohibit, according to the indication information, triggering an SRVCC procedure for the terminal.

18. The access network element according to claim 17, wherein the receiver is further configured to receive a bearer setup request sent by the mobility management network element, wherein the bearer setup request is used to request to set up a VoLTE service bearer for the terminal; and the processor is further configured to reject the bearer setup request if it is determined that Long Term Evolution (LTE) network signal quality of the terminal is less than a specified value.

* * * * *